US012761777B2

(12) United States Patent
Wan et al.

(10) Patent No.: US 12,761,777 B2
(45) **Date of Patent: *Oct. 13, 2026**

(54) METHOD AND APPARATUS FOR AIMING AT VIRTUAL OBJECT, DEVICE, AND STORAGE MEDIUM

(71) Applicant: TENCENT TECHNOLOGY (SHENZHEN) COMPANY LIMITED, Shenzhen (CN)

(72) Inventors: Yu Lin Wan, Shenzhen (CN); Jianmiao Weng, Shenzhen (CN); Xun Hu, Shenzhen (CN); Shan Dong Su, Shenzhen (CN); Yong Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/398,972

(22) Filed: Dec. 28, 2023

(65) Prior Publication Data

US 2024/0143145 A1 May 2, 2024

Related U.S. Application Data

(63) Continuation of application No. 17/505,226, filed on Oct. 19, 2021, now Pat. No. 11,893,217, which is a
(Continued)

(30) Foreign Application Priority Data

Jun. 5, 2020 (CN) ......................... 202010508239.5

(51) Int. Cl.

| | |
|---|---|
| ***G06F 3/04842*** | (2022.01) |
| ***A63F 13/53*** | (2014.01) |
| ***G06F 3/04815*** | (2022.01) |

(52) U.S. Cl.
CPC .......... *G06F 3/04842* (2013.01); *A63F 13/53* (2014.09); *G06F 3/04815* (2013.01)

(58) Field of Classification Search
CPC .. G06F 3/04842; G06F 3/04815; A63F 13/53; A63F 13/5372; A63F 2300/308;
(Continued)

(56) References Cited

U.S. PATENT DOCUMENTS 6,409,604 B1 6/2002 Matsuno
9,704,350 B1 7/2017 Rigopulos
(Continued)

FOREIGN PATENT DOCUMENTS

CA 2974841 A1 12/2016
CN 105194873 A 12/2015
(Continued)

OTHER PUBLICATIONS

Communication dated Nov. 30, 2023 from the Vietnamese Patent Office in Application No. 1-2021-06922.
(Continued)

*Primary Examiner* — Eric J Yoon
(74) *Attorney, Agent, or Firm* — Sughrue Mion, PLLC

(57) ABSTRACT

A method and apparatus for aiming at a virtual object in a virtual environment, which: displays a user interface (UI), the UI including a picture of a virtual environment including a first virtual object and at least one second virtual object located in the virtual environment; displays a dot aiming indicator in the virtual environment in response to an aiming instruction, the dot aiming indicator being used for indicating an aiming point selected by an aiming operation on a ground plane of the virtual environment; and controls the first virtual object to aim at a target virtual object, which is a virtual object selected from a second virtual object in a
(Continued)

target selection range which is a selection range determined by using the aiming point as a benchmark.

13 Claims, 14 Drawing Sheets

Related U.S. Application Data continuation of application No. PCT/CN2021/095101, filed on May 21, 2021.

(58) Field of Classification Search
CPC .. A63F 2300/807; A63F 13/837; A63F 13/52; A63F 13/537; A63F 2300/8076; A63F 13/426; A63F 13/219; A63F 13/2145
See application file for complete search history.

(56) References Cited

U.S. PATENT DOCUMENTS

| | | | | |
|---|---|---|---|---|
| 9,766,040 | B2 | 9/2017 | Roman et al. | |
| 2004/0110560 | A1 | 6/2004 | Aonuma | |
| 2015/0231509 | A1* | 8/2015 | McMain, II | A63F 13/837 463/31 |
| 2017/0340959 | A1 | 11/2017 | Tang | |
| 2018/0024660 | A1 | 1/2018 | Wang | |
| 2018/0369693 | A1* | 12/2018 | Rong | A63F 13/92 |
| 2019/0091570 | A1* | 3/2019 | Wang | A63F 13/42 |
| 2021/0245062 | A1 | 8/2021 | Wu et al. | |

FOREIGN PATENT DOCUMENTS

| | | | |
|---|---|---|---|
| CN | 107450812 | A | 12/2017 |
| CN | 108310772 | A | 7/2018 |
| CN | 109513209 | A | 3/2019 |
| CN | 109847336 | A | 6/2019 |
| CN | 109865282 | A | 6/2019 |
| CN | 107899241 | B | 5/2020 |
| CN | 111672119 | A | 9/2020 |
| JP | 2000167239 | A | 6/2000 |
| JP | 2018-518997 | A | 7/2018 |
| JP | 2019-136358 | A | 8/2019 |

OTHER PUBLICATIONS

Jihye Kim,"Penta Storm, play the game to your taste with control settings!: Game News", Smart Now Co., Ltd, Apr. 27, 2017 (8 pages).
Communication dated Mar. 16, 2023 from the Singapore Patent Office in Application No. 11202112323W.
Written Opinion from the Singapore Patent Office dated Mar. 16, 2023 in Application No. 11202112323W.
Search Report dated Mar. 16, 2023 issued by the Singapore Patent Office in application No. 11202112323W.
Office Action issued Dec. 5, 2022 in Japanese Application No. 2021-566345.
Extended European Search Report issued Jun. 15, 2022 in European Application No. 21783116.3.
"How the Royal Glory Wheel Works", Sep. 18, 2017, 4 pgs., https://jingyan.baidu.eom/article/17bd8e524b54a785ab2bb8c1.html.
Chinese Office Action for 202010508239.5 dated May 26, 2021.
Chinese Search Report for 2020105082395 dated, Jun. 5, 2020.
International Search Report for PCT/CN2021/095101 dated, Aug. 18, 2021 (PCT/ISA/210).
Written Opinion of the International Searching Authority for CN2021/095101 dated, Aug. 18, 2021 (PCT/ISA/237).
"Dynamic explosive damage radius," posted by Kitteh6660 in a Reddit forum for the game Fortnite, published in 2018, downloaded from https://www.reddit.com/r/FortNiteBR/comments/93vytw/dynamic_explosive_damage_radius/ (Year: 2018).
J. Perez, "Totem Talk: The Curious Case of Chain Heal," Engadget website, published Oct. 22, 2013, downloaded from https://www.engadget.com/2013-10-22-totem-talk-the-curious-case-of-chain-heal.html (Year: 2013).
Article at the Liquipedia website, "Splash Damage," dated Aug. 31, 2019, downloaded from https://liquipedia.net/starcraft2/Index.php?title=Spalsh_damage&oldid=1546497 (Year: 2019).
YouTube video, "Starcraft 2: Tons of Nukes in a Pro Game," dated Mar. 7, 2018, downloaded from https://www.youtube.com/watch?v=FcnhekTNHPg (Year: 2018).

* cited by examiner

METHOD AND APPARATUS FOR AIMING AT VIRTUAL OBJECT, DEVICE, AND STORAGE MEDIUM

CROSS-REFERENCE TO RELATED APPLICATION(S)

This application is a Continuation Applications of U.S. application Ser. No. 17/505,226 filed on Oct. 19, 2021, which is a by-pass continuation of International Application No. PCT/CN2021/095101 filed on May 21, 2021 and claims priority to Chinese Patent Application No. 202010508239.5, entitled "METHOD AND APPARATUS FOR AIMING AT VIRTUAL OBJECT, DEVICE, AND MEDIUM" and filed with the China National Intellectual Property Administration on Jun. 5, 2020, the disclosures of which are incorporated by reference in their entireties.

FIELD

The disclosure relates to the field of virtual environments, and in particular, to a method, apparatus, device, and storage medium for aiming at a virtual object.

BACKGROUND

A battle game is a game in which a plurality of virtual objects compete in the same virtual world. The battle game is a multiplayer online battle arena (MOBA) game.

In a typical MOBA game, a first virtual object controlled by a user has a targeted ability. When the targeted ability is used, a terminal may display a fan-shaped ability indicator. The fan-shaped ability indicator includes a fan-shaped region under the feet of the first virtual object, and a symmetry axis of the fan-shaped region is an aiming line. The user may drag the fan-shaped ability indicator to rotate around the first virtual object, a candidate virtual object that is located in the fan-shaped region and closest to the aiming line is determined as an aimed target virtual object, and the first virtual object controlled by the user then casts an ability to the target virtual object.

SUMMARY

According to an aspect of the disclosure, a method for aiming at a virtual object is provided, including:

- displaying a user interface (UI), the UI including a picture of a virtual environment, the picture of the virtual environment being a picture obtained by observing the virtual environment by using a first virtual object as an observation center, the picture of the virtual environment including the first virtual object and at least one second virtual object located in the virtual environment;
- displaying a dot aiming indicator in the virtual environment in response to an aiming instruction, the dot aiming indicator being used for indicating an aiming point selected by an aiming operation on a ground plane of the virtual environment; and
- controlling the first virtual object to aim at a target virtual object, the target virtual object being a virtual object selected from the at least one second virtual object in a target selection range, the target selection range being a selection range determined by using the aiming point as a benchmark.

According to another aspect of the disclosure, an apparatus for aiming at a virtual object is provided, including:

- a display module, configured to display a user interface (UI), the UI including a picture of a virtual environment, the picture of the virtual environment being a picture obtained by observing the virtual environment by using a first virtual object as an observation center, the picture of the virtual environment including the first virtual object and at least one second virtual object located in the virtual environment;
- the displaying module being further configured to display a dot aiming indicator in the virtual environment in response to an aiming instruction, the dot aiming indicator being used for indicating an aiming point selected by an aiming operation on a ground plane of the virtual environment; and
- an aiming module, configured to control the first virtual object to aim at a target virtual object, the target virtual object being a virtual object selected from the at least one second virtual object in a target selection range, the target selection range being a selection range determined by using the aiming point as a benchmark.

According to another aspect of the disclosure, a computer device is provided, including a processor and a memory, the memory storing at least one instruction, at least one program, a code set, or an instruction set, the at least one instruction, the at least one program, the code set, or the instruction set being loaded and executed by the processor to implement the method for aiming at a virtual object according to the foregoing aspect.

According to another aspect of the disclosure, a computer-readable storage medium is provided, storing at least one instruction, at least one program, a code set, or an instruction set, the at least one instruction, the at least one program, the code set, or the instruction set being loaded and executed by a processor to implement the method for aiming at a virtual object according to the foregoing aspect.

According to another aspect of the disclosure, a computer program product is provided, the computer program product, when run on a computer device, causing the computer device to perform the method for aiming at a virtual object according to the foregoing aspect.

BRIEF DESCRIPTION OF THE DRAWINGS

To describe the technical solutions of example embodiments of the disclosure more clearly, the following briefly introduces the accompanying drawings required for describing the embodiments. The accompanying drawings in the following description show only some embodiments of the disclosure, and a person of ordinary skill in the art may still derive other drawings from these accompanying drawings without creative efforts. One of skill would also recognize that aspects of embodiments may be implemented alone or in combination with aspects of other embodiments.

DETAILED DESCRIPTION

Figure 1:
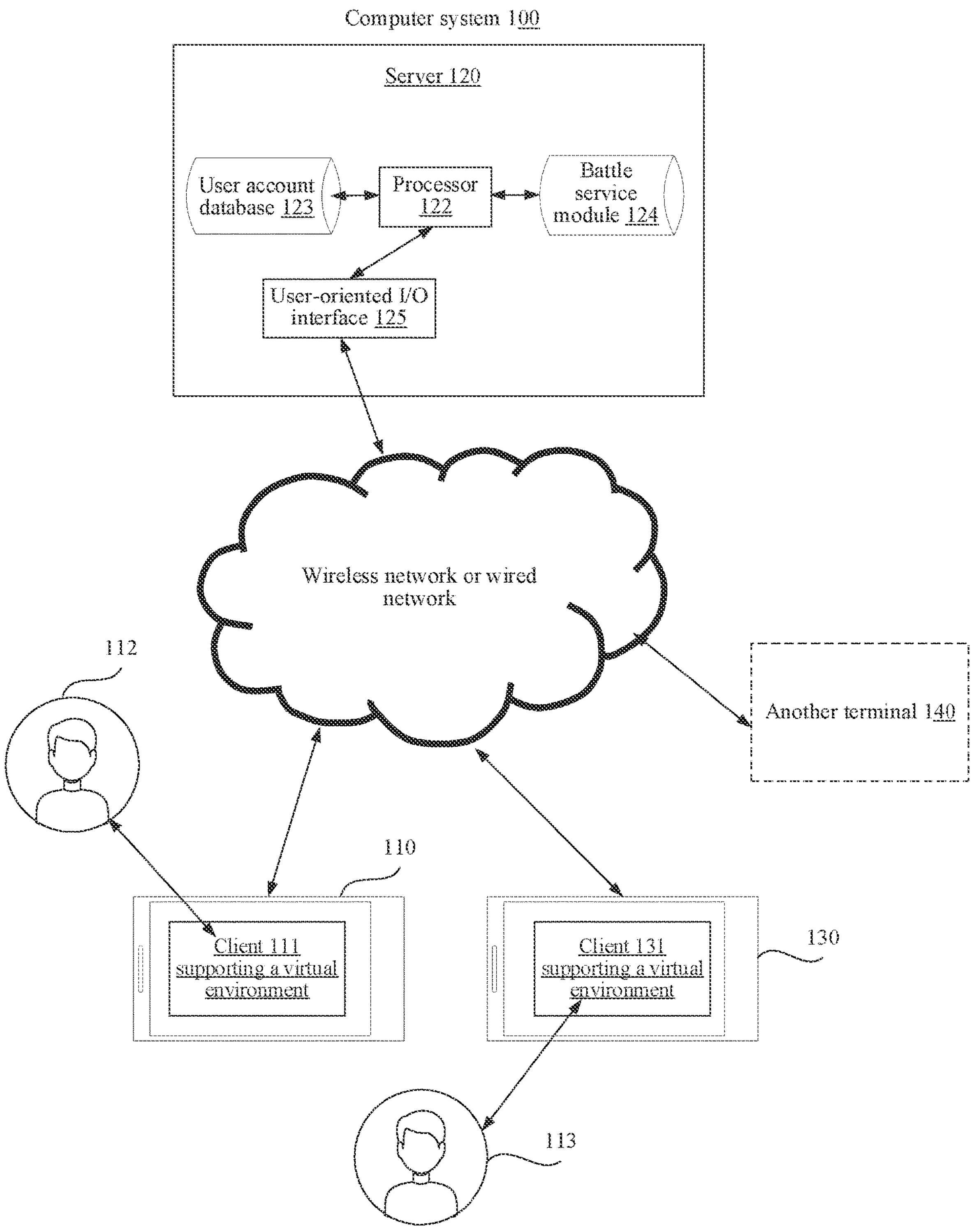
FIG. 1 is a structural block diagram of a computer system according to an exemplary embodiment of the disclosure.

To make the objectives, technical solutions, and advantages of aspects of the disclosure clearer, the following further describes implementations of the disclosure in detail with reference to the accompanying drawings.

First, terms involved in the embodiments the disclosure are briefly introduced.

Virtual environment: It refers to a virtual environment displayed (or provided) by an application program when run on a terminal. The virtual environment may be a simulated world of a real world, or may be a semi-simulated semi-fictional three-dimensional (3D) world, or may be an entirely fictional 3D world. The virtual environment may be any one of a two-dimensional virtual environment, a 2.5-dimensional virtual environment, and a three-dimensional virtual environment. The virtual environment is further used for a virtual environment battle between at least two virtual objects, and there are virtual resources available to the at least two virtual objects in the virtual environment. The virtual environment includes a lower left corner region and an upper right corner region that are symmetrical. Virtual objects on two opposing sides occupy the regions respectively, and the objective of each side is to destroy a target building/fort/base/crystal deep in the opponent's region to win victory.

Virtual object: It refers to a movable object in the virtual environment. The movable object may be at least one of a virtual character, a virtual animal, and a cartoon character. When the virtual environment is a three-dimensional virtual environment, the virtual object may be a three-dimensional virtual model. Each virtual object has a shape and a volume in the three-dimensional virtual environment, and occupies some space in the three-dimensional virtual environment. The virtual object is a three-dimensional character constructed based on three-dimensional human skeleton technology. The virtual object wears different skins to implement different appearances. In some implementations, the virtual object may be alternatively implemented by using a 2.5-dimensional model or a two-dimensional model. This is not limited in the embodiments of the disclosure. For example, the virtual object is controlled by a user through a client or is controlled by a server.

A MOBA game may be an arena game in which different virtual teams on at least two opposing camps occupy respective map regions in a virtual environment, and compete against each other using specific victory conditions as goals. The victory conditions include, but are not limited to at least one of occupying forts or destroy forts of the opposing camps, killing virtual objects in the opposing camps, ensure own survivals in a specified scenario and time, seizing a specific resource, and outscoring the opponent within a specified time. The battle arena game may take place in rounds. The same map or different maps may be used in different rounds of the battle arena game. Each virtual team includes one or more virtual objects, for example, 1 virtual object, 2 virtual objects, 3 virtual objects, or 5 virtual objects.

A MOBA game may be a game in which several forts are provided in a virtual environment, and users in different camps control virtual objects to battle in the virtual environment, occupy forts or destroy enemy camp forts. For example, in the MOBA game, the users may be divided into two opposing camps. The virtual objects controlled by the users are scattered in the virtual environment to compete against each other, and the victory condition is to destroy or occupy all enemy forts. The MOBA game takes place in rounds. A duration of a round of the MOBA game is from a time point at which the game starts to a time point at which the victory condition is met.

User interface (UI) control: It is any visual control or element that can be seen in a UI of an application program, for example, a control such as a picture, an input box, a text box, a button, or a label. Some UI controls respond to an operation of a user. For example, an ability control is configured to control a master virtual object to cast an ability. A user triggers the ability control to control a master virtual object to cast an ability. The UI controls involved in the embodiments of the disclosure include, but are not limited to: an ability control and a movement control.

In a typical MOBA game, a candidate virtual object that is closest to an aiming line is determined as an aimed target virtual object. However, an active aiming operation in a MOBA game is high in costs, when a predicted attack target and other targets are in the same straight line of the aiming line, it is hard to accurately select the predicted attack target, an operation time is long and a mistake probability is high, a target outside an ability range cannot be selected, a target cannot be aimed in advance, and operation experience is poor.

Embodiments of the disclosure provide a method and an apparatus for aiming at a virtual object, a device, and a medium, to improve the accuracy of a user during active aiming.

FIG. 1 is a structural block diagram of a computer system to which the method for aiming at a virtual object is applicable according to an exemplary embodiment of the disclosure. The computer system 100 includes a first terminal 110, a server 120, and a second terminal 130.

A client 111 supporting a virtual environment is installed and run on the first terminal 110, and the client 111 may be a multiplayer online battle program. When the first terminal runs the client 111, a UI of the client 111 is displayed on a screen of the first terminal 110. The client may be any one of a military simulation program, an escape shooting game, a virtual reality (VR) application program, an augmented reality (AR) program, a three-dimensional map program, a VR game, an AR game, a first-person shooting (FPS) game, a third-person shooting (TPS) game, a MOBA game, and a simulation game (SLG). In this embodiment, an example in which the client is a MOBA game is used for description. The first terminal 110 is a terminal used by a first user 112. The first user 112 uses the first terminal 110 to control a first virtual object located in the virtual environment to perform activities, and the first virtual object may be referred to as a master virtual object of the first user 112. The activities of the first virtual object include, but are not limited to: at least one of adjusting body postures, crawling, walking, running, riding, flying, jumping, driving, picking, shooting, attacking, and throwing. For example, the first virtual object is a first virtual character such as a simulated character role or a cartoon character role.

A client 131 supporting the virtual environment is installed and run on the second terminal 130, and the client 131 may be a multiplayer online battle program. When the second terminal 130 runs the client 131, a UI of the client 131 is displayed on a screen of the second terminal 130. The client may be any one of a military simulation program, an escape shooting game, a VR application program, an AR program, a three-dimensional map program, a VR game, an AR game, an FPS game, a TPS game, a MOBA game, and an SLG. In this embodiment, an example in which the client is a MOBA game is used for description. The second terminal 130 is a terminal used by a second user 113. The second user 113 uses the second terminal 130 to control a second virtual object located in the virtual environment to perform activities, and the second virtual object may be referred to as a master virtual object of the second user 113. For example, the second virtual object is a second virtual character, such as a simulated character role or a cartoon character role.

The first virtual character and the second virtual character are located in the same virtual environment. The first virtual character and the second virtual character may belong to the same camp, the same team, or the same organization, have a friend relationship, or have a temporary communication permission. The first virtual character and the second virtual character may belong to different camps, different teams, or different organizations, or have a hostile relationship with each other.

The client installed on the first terminal 110 is the same as the client installed on the second terminal 130, or the clients installed on the two terminals are the same type of clients of different operating system platforms (Android system or iOS system). The first terminal 110 may generally refer to one of a plurality of terminals, and the second terminal 130 may generally refer to another one of a plurality of terminals. In this embodiment, only the first terminal 110 and the second terminal 130 are used as an example for description. The first terminal 110 and the second terminal 130 are of the same or different device types, and the device type includes at least one of a smartphone, a tablet computer, an e-book reader, an MP3 player, an MP4 player, a laptop portable computer, and a desktop computer.

FIG. 1 shows only two terminals. However, a plurality of other terminals 140 may access the server 120 in different embodiments. One or more terminals 140 are terminals corresponding to a developer. A developing and editing platform for a client supporting a virtual environment is installed on the terminal 140. The developer may edit and update the client on the terminal 140 and transmit an updated client installation package to the server 120 by using a wired or wireless network. The first terminal 110 and the second terminal 130 may download the client installation package from the server 120 to update the client.

The first terminal 110, the second terminal 130, and the another terminal 140 are connected to the server 120 through a wireless network or a wired network.

The server 120 includes at least one of one server, a plurality of servers, a cloud computing platform, and a virtualization center. The server 120 is configured to provide a background service for a client supporting a three-dimensional virtual environment. The server 120 takes on primary computing work, and the terminals take on secondary computing work; alternatively, the server 120 takes on secondary computing work, and the terminals take on primary computing work; alternatively, collaborative computing is performed by using a distributed computing architecture between the server 120 and the terminals.

In a schematic example, the server 120 includes a processor 122, a user account database 123, a battle service module 124, and a user-oriented input/output (I/O) interface 125. The processor 122 is configured to load instructions stored in the server 121, and process data in the user account database 123 and the battle service module 124. The user account database 123 is configured to store data of user accounts used by the first terminal 110, the second terminal 130, and the another terminal 140, for example, profile pictures of the user accounts, nicknames of the user accounts, combat power indices of the user accounts, and service regions where the user accounts are located. The battle service module 124 is configured to provide a plurality of battle rooms for the users to battle, such as a 1V1 battle room, a 3V3 battle room, and a 5V5 battle room. The user-oriented I/O interface 125 is configured to establish communication with the first terminal 110 and/or the second terminal 130 by using a wireless network or a wired network to exchange data.

The server 120 may use a synchronization technology to achieve a consistent picture presentation among a plurality of clients. For example, the synchronization technology used by the server 120 may include: a state synchronization technology and a frame synchronization technology.

State Synchronization Technology

Figure 2:
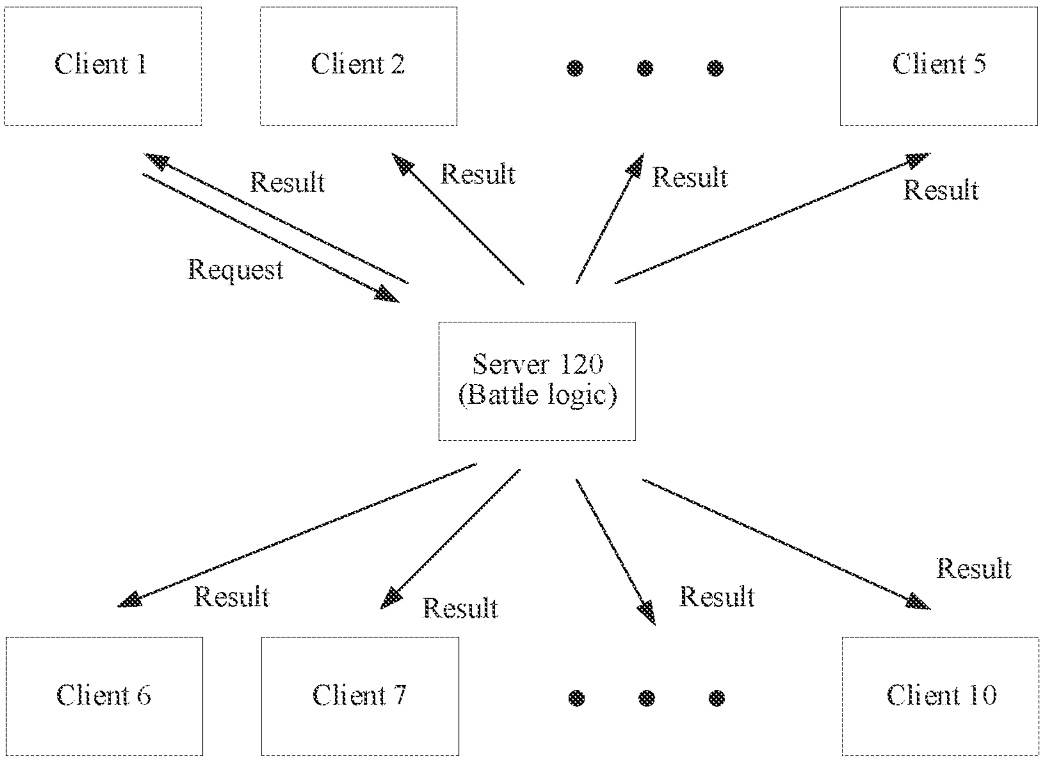
FIG. 2 is a schematic diagram of a state synchronization technology according to an exemplary embodiment of the disclosure.

In the embodiment based on FIG. 1, the server 120 uses a state synchronization technology to synchronize with a plurality of clients. In the state synchronization technology, as shown in FIG. 2, battle logic is run in the server 120. When a state of one virtual object in the virtual environment changes, the server 120 transmits a state synchronization result to all clients such as clients 1 to 10.

In an exemplary example, the client 1 transmits a request to the server 120, and the request is used for requesting a virtual object 1 to cast a frost ability. The server 120 determines whether the frost ability is permitted to cast and a damage value to another virtual object 2 when the frost ability is permitted to cast. The server 120 then transmits an ability casting result to all the clients, and all the clients update local data and an interface presentation according to the ability casting result.

Frame Synchronization Technology

Figure 3:
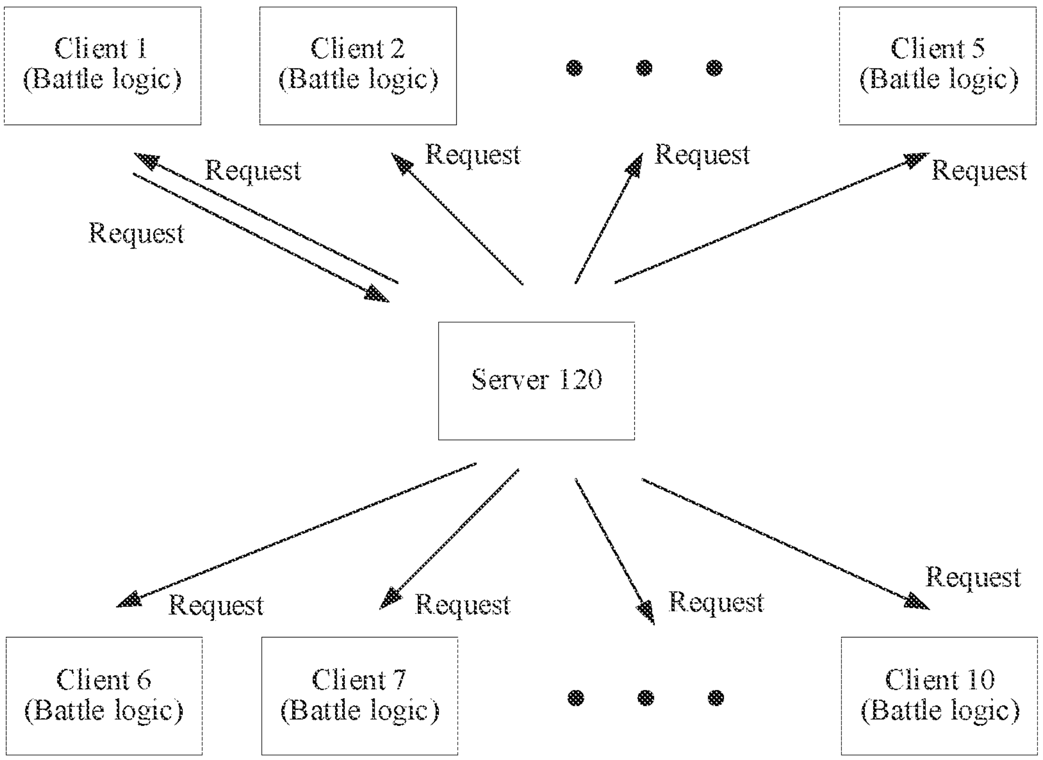
FIG. 3 is a schematic diagram of a frame synchronization technology according to an exemplary embodiment of the disclosure.

In the embodiment based on FIG. 1, the server 120 uses a frame synchronization technology to synchronize with a plurality of clients. In the frame synchronization technology, as shown in FIG. 3, battle logic is run in the clients. Each client may transmit a frame synchronization request to the server, and the frame synchronization request carries local data change of the client. After one frame synchronization request is received, the server 120 forwards the frame synchronization request to all clients. After the frame synchronization request is received, each client processes the frame synchronization request according to local battle logic, and updates local data and an interface presentation.

The method for displaying a picture of a virtual environment provided in the embodiments of the disclosure is described in combination with the description of the virtual environment and the description of the implementation environment, and an example in which an execution entity of the method is a client run on the terminal shown in FIG. 1 is used for description. A client is run on the terminal, and the client is an application program supporting a virtual environment.

For example, an example in which the method for aiming at a virtual object provided in the disclosure is applicable to a MOBA game is used.

The aiming refers to selecting one or more target virtual objects from a plurality of virtual objects. Based on this, aiming points in the embodiments of the disclosure may be selection points when one or more target virtual objects are selected from a plurality of virtual objects. Similarly, an aiming line may be also referred to as a selection line, an aiming instruction may be also referred to as a selection instruction, and details are not described herein again.

Figure 4:
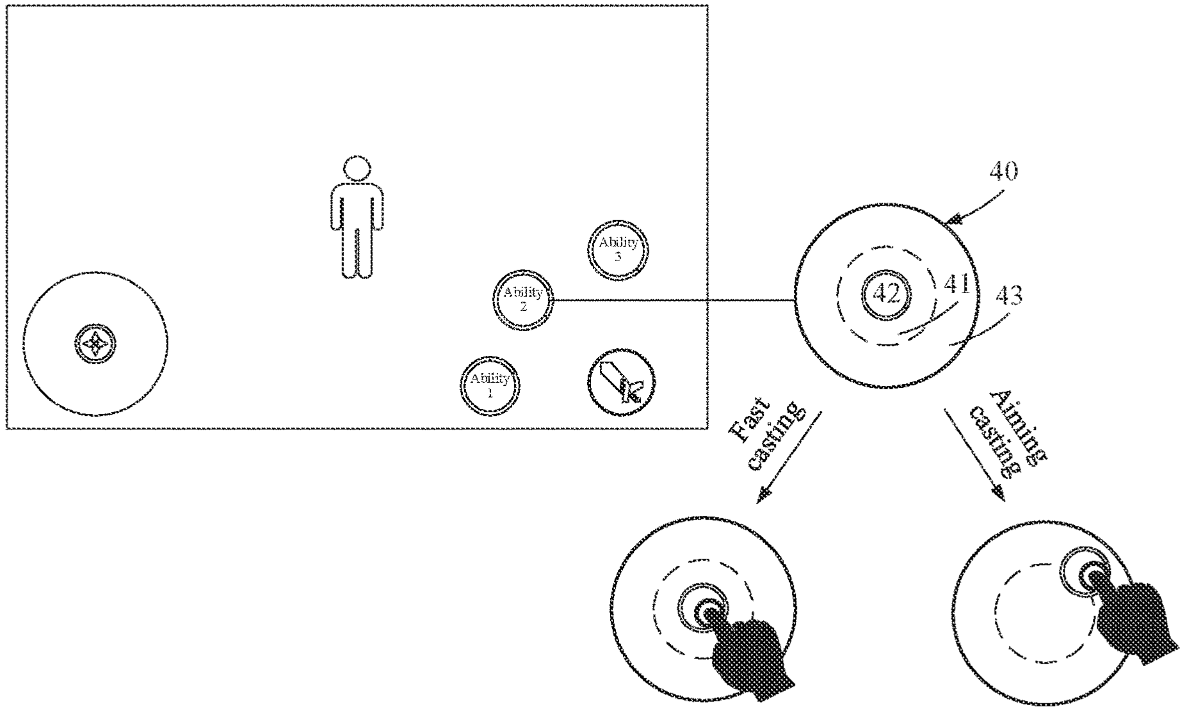
FIG. 4 is a schematic diagram of a wheel aiming control according to an exemplary embodiment of the disclosure.

In a MOBA game, as shown in FIG. 4, a user may control a first virtual object to cast a targeted ability or a targeted attack by controlling a wheel aiming control. The wheel aiming control includes a wheel region 40 and a joystick button 42. An area of the wheel region 40 is greater than an area of the joystick button 42. A position of the joystick button 42 may move in the wheel region 40. The wheel region 40 is divided into an inner ring region 41 and an outer ring region 43. The inner ring region 41 may be also referred to as a dead region.

Figure 5:
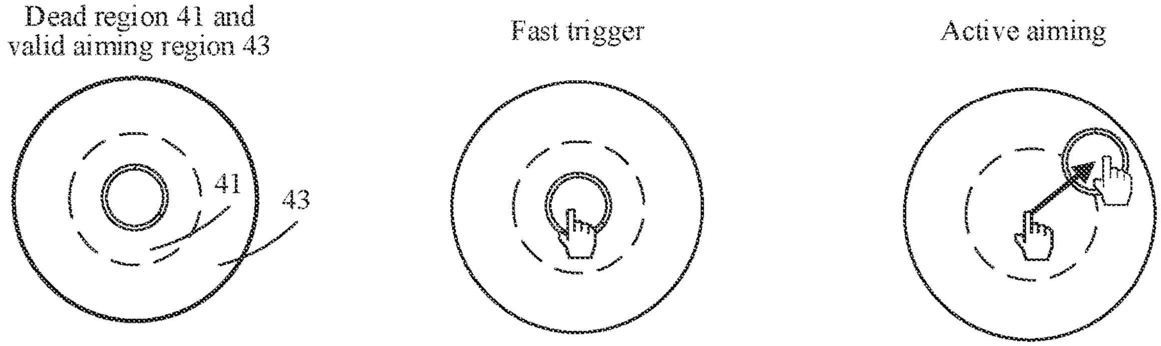
FIG. 5 is a schematic diagram of two trigger manners of a wheel aiming control according to another exemplary embodiment of the disclosure.

As can be known with reference to FIG. 5, a fast trigger mode and an active aiming mode are classified according to different function positions of an aiming operation of the user.

When the user taps the joystick button 42 in the inner ring region 41, a fast casting mode (also referred to as fast casting or auto casting) is triggered. The fast casting mode refers to that: the client may automatically select, according to a default attack object selection rule, a target virtual object within a circular casting range centered around the first virtual object. When a finger of the user leaves the joystick button 42, the client controls the first virtual object to cast a targeted ability or a targeted attack to the target virtual object.

Figure 6:
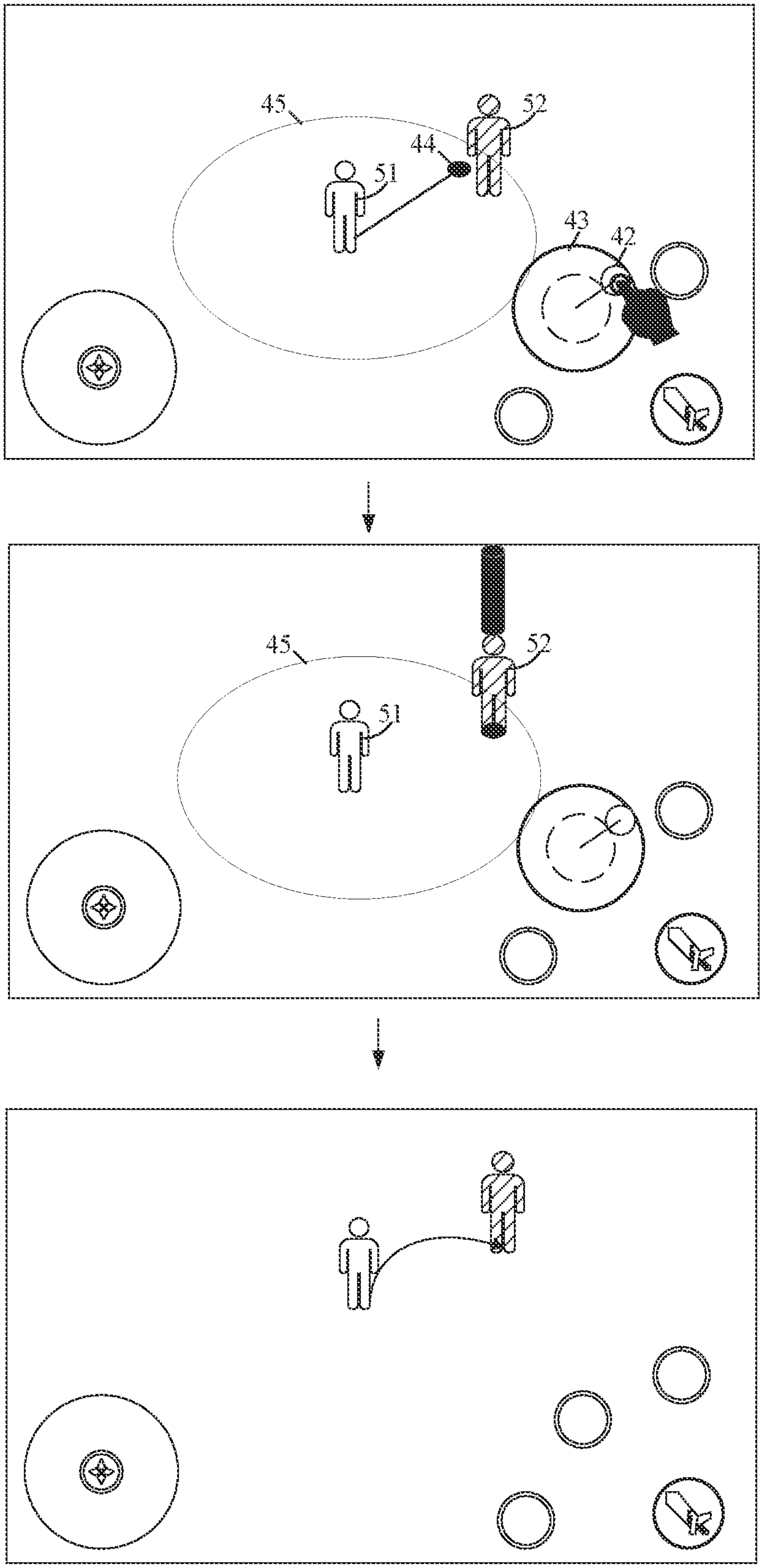
FIG. 6 is a schematic diagram of an interface of a method for aiming at a virtual object according to another exemplary embodiment of the disclosure.

When the user taps the joystick button 42 and drags the joystick button 42 into the outer ring region 43, an active aiming mode is triggered. As shown in FIG. 6, the active aiming mode provided in the embodiments of the disclosure refers to mapping and displaying a dot aiming indicator 44 and a shooting range indicator 45 according to a position of the joystick button 42 in the outer ring region 43. The dot aiming indicator 44 is used for indicating an aiming point of an aiming operation in the virtual environment, and a position of the dot aiming indicator 44 corresponds to the position of the joystick button 42. The shooting range indicator 45 is used for indicating a maximum shooting range of a targeted ability or a targeted attack, the shooting range indicator 45 corresponds to an outer edge of the outer ring region 43, and the shooting range indicator 45 is generally a circular casting range. The user may change the position of the joystick button 42 in the outer ring region 43 to change a display position of the dot aiming indicator 44 in the circular casting range 45. When the finger of the user leaves the joystick button 42, the client controls the first virtual object 51 to aim at the target virtual object 52 and cast a targeted ability or a targeted attack. The target virtual object 52 is a virtual object that is closest to the aiming point 44 in virtual objects except the first virtual object.

In an example, the first virtual object 51 jumps to a position of the target virtual object 52, and casts a slash-type attack with huge damage to the target virtual object 52.

Figure 7:
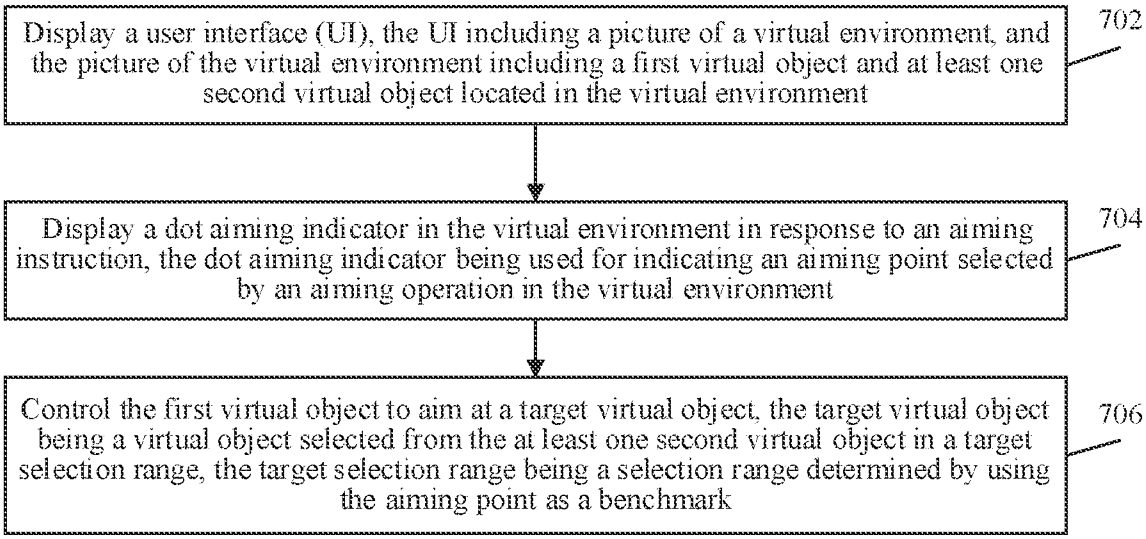
FIG. 7 is a flowchart of a method for aiming at a virtual object according to an exemplary embodiment of the disclosure.

FIG. 7 is a flowchart of a method for aiming at a virtual object according to an exemplary embodiment of the disclosure. This embodiment is described by using an example in which the method is performed by the terminal (or client) shown in FIG. 1. The method includes the following steps:

Step 702: Display a user interface (UI), the UI including a picture of a virtual environment, the picture of the virtual environment including a first virtual object and at least one second virtual object located in the virtual environment.

The picture of the virtual environment is a picture obtained by observing the virtual environment from a perspective corresponding to the first virtual object. For example, the picture of the virtual environment is a two-dimensional picture obtained after performing picture acquisition on a three-dimensional virtual environment and displayed on the client. For example, a shape of the picture of the virtual environment may be determined according to a shape of a display screen of the terminal or determined according to a shape of a UI of the client. An example in which the display screen of the terminal is rectangular is used, the picture of the virtual environment is also displayed as a rectangular picture.

A camera model bound to the first virtual object is disposed in the virtual environment. The picture of the virtual environment is a picture photographed by the camera model by using an observation position in the virtual environment as an observation center. The observation center is a center of the picture of the virtual environment. An example in which the picture of the virtual environment is a rectangular picture is used, and an intersection point of rectangular diagonal lines in the picture of the virtual environment is the observation center. In general cases, the camera model bound to the first virtual object uses the first virtual object as the observation center, and a position of the first virtual object in the virtual environment is the observation position. The observation position is a coordinate position in the virtual environment. When the virtual environment is a three-dimensional virtual environment, the observation position is three-dimensional coordinates. For example, if a ground plane in the virtual environment is a horizontal plane, a height coordinate of the observation position is 0, and the observation position may be approximately represented as two-dimensional coordinates on the horizontal plane.

The first virtual object is a virtual object controlled by the client. The client controls, according to received user operations (or referred to as human-computer operations), activities of the first virtual object in the virtual environment. For example, the activities of the first virtual object in the virtual environment include: walking, running, jumping, climbing, going prone, attacking, casting an ability, picking up a prop, and transmitting a message.

An ability is a capability that is used or cast by a virtual object to attack the virtual object self or other virtual objects, generate a debuff effect or generate a buff effect. The ability is classified into a targeted ability and an area of effect (AOE) ability according to shooting ranges. The targeted ability is an ability cast toward an aimed direction or region or virtual object within the maximum shooting range. The AOE ability is an ability cast toward all regions within the maximum shooting range. The ability is classified into an active ability and a passive ability according to types. The active ability is an ability that is actively used or cast by a virtual object, and the passive ability is an ability that is automatically triggered when a passive condition is met.

For example, the targeted ability mentioned in this embodiment is an active ability that is actively used or cast by the first virtual object under the control of the user, and the ability is an ability cast toward an aimed target virtual object within the maximum shooting range.

For example, the targeted ability mentioned in this embodiment is a normal attack that is actively used or cast by the first virtual object under the control of the user, and the attack is a normal attack cast toward an aimed target virtual object within the maximum shooting range.

Step 704: Display a dot aiming indicator in the virtual environment in response to an aiming instruction, the dot aiming indicator being used for indicating an aiming point selected by an aiming operation on a ground plane of the virtual environment.

The aiming instruction is triggered by an aiming operation (or an ability casting operation or an attack operation) of the user. In an example, the aiming instruction is triggered by a drag operation on the wheel aiming control. In another example, the aiming instruction is triggered by a drag operation on a joystick button of a physical handle. A trigger manner of the aiming instruction is not limited in the disclosure.

In this embodiment, an example in which the aiming instruction is an instruction triggered by a drag operation exceeding the dead region on the wheel aiming control is used. In this case, the "aiming operation" is the drag operation exceeding the dead region on the wheel aiming control. As can be known with reference to FIG. 6, after a drag operation is received on the wheel aiming control, the terminal maps and displays the dot aiming indicator 44 according to the position of the joystick button 42 in the outer ring region 43.

Step 706: Control the first virtual object to aim at a target virtual object, the target virtual object being a virtual object selected from the at least one second virtual object in a target selection range, the target selection range being a selection range determined by using the aiming point as a benchmark.

The target selection range is a selection range determined by using the aiming point as a benchmark. The target selection range is located on the ground plane of the virtual environment, the target selection range uses a first map point in which the first virtual object is located as a rotation center, and a symmetry axis of the target selection range runs through the aiming point.

The target virtual object is a virtual object selected from the at least one second virtual object in the target selection range. The target virtual object is a virtual object selected from the at least one second virtual object in the target selection range according to a priority principle. The priority principle includes at least one of the following principles:

- preferentially selecting a candidate virtual object closest to the aiming point;
- preferentially selecting a candidate virtual object having a lowest health bar;
- preferentially selecting a candidate virtual object having a smallest health point absolute value; and
- preferentially selecting a candidate virtual object having a highest type priority.

For example, the aiming in this embodiment includes normal aiming and locked aiming. The normal aiming refers to that aiming is canceled automatically when a position of an aimed target (target virtual object) changes. The locked aiming refers to that aiming will not be canceled when the position of the aimed target (target virtual object) changes.

For example, after the first virtual object aims at the target virtual object in the normal aiming manner, when the target virtual object moves to change a position, the first virtual object no longer aims at the target virtual object and may not cast an ability or performs a normal attack to the target virtual object. If the user intends to continue to aim at the target virtual object, the user needs to perform an aiming operation again to aim at the target virtual object.

For example, after the first virtual object aims at the target virtual object in the locked aiming manner, the first virtual object may continuously aim at the target virtual object to cast an ability or perform a normal attack. In an embodiment, after the first virtual object aims at the target virtual object in the locked aiming manner, when the position of the target virtual object changes to cause the position of the target virtual object to exceed an attack range (aiming range) of the first virtual object, the client may automatically control the first virtual object to follow the target virtual object to continue to aim at the target virtual object and attack. For example, a method for stopping locked aiming may include the following: after an aiming duration reaches a predetermined duration, locked aiming is stopped; after the target virtual object moves out of the aiming range of the first virtual object, aiming is stopped; after the target virtual object or the first virtual object is dead, aiming is stopped; and when the user performs an aiming operation again to aim at another virtual object, aiming at the target virtual object is stopped.

Based on the above, according to the method provided in this embodiment, a click position of a mouse on a computer side is simulated by using an aiming point, and a virtual object is selected from second virtual objects within a target selection range determined by using the aiming point as a benchmark as an aimed target virtual object. Since the target selection range is a selection range determined by using the aiming point as a benchmark, and the targeting accuracy of the aiming point is better than the targeting accuracy of an aiming line, so that a target may be selected more stably through active aiming and it is not easy to select a wrong target. Therefore, the accuracy of a user during active aiming may be improved, a time consumed when a target is selected through active aiming is reduced, operation costs are reduced, and the efficiency of human-computer interaction and operation experience of the user are improved. In addition, more ability design space is provided for designers of the client.

Figure 8:
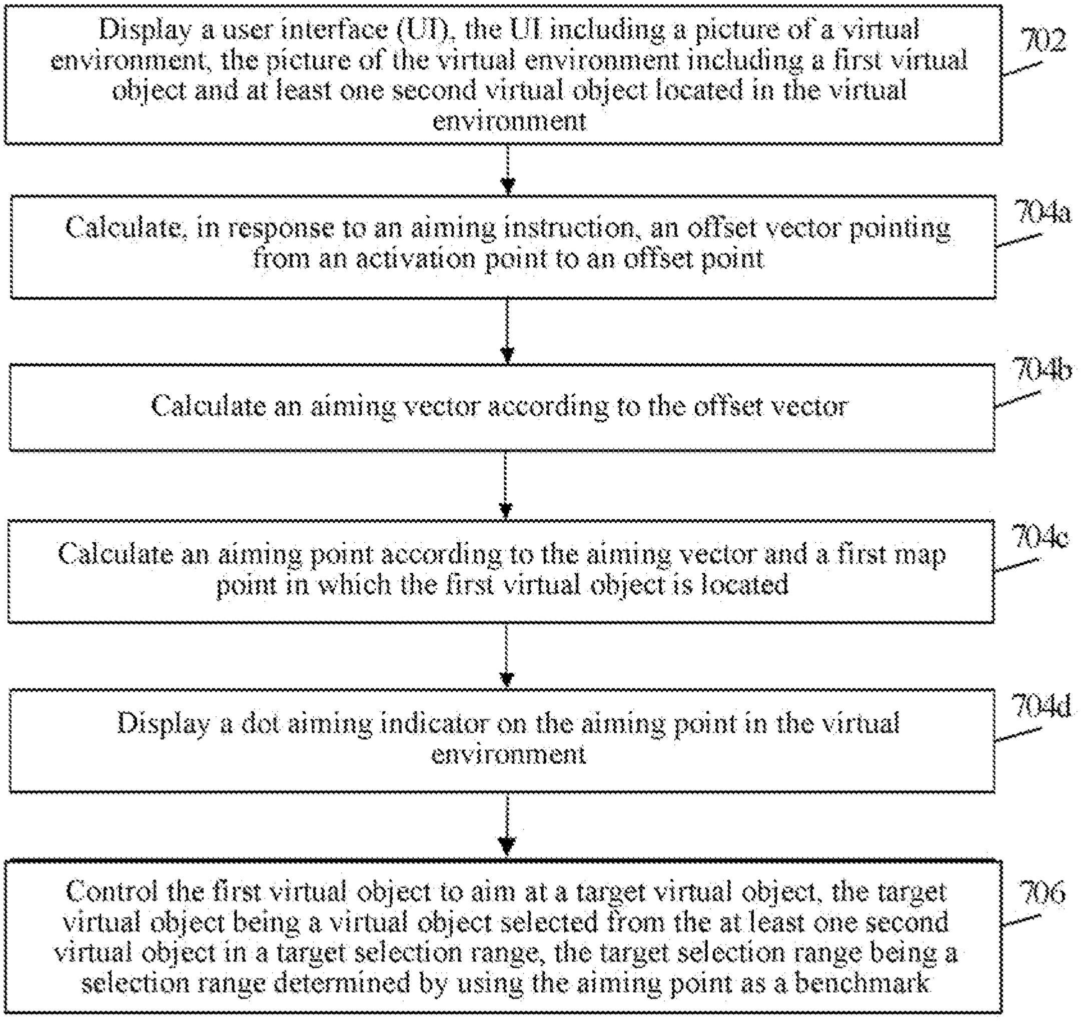
FIG. 8 is a flowchart of a method for aiming at a virtual object according to another exemplary embodiment of the disclosure.

In an embodiment based on the embodiment of FIG. 7, the aiming instruction is triggered by the wheel aiming control. The UI displayed by the client includes a wheel aiming control, and the wheel aiming control is superimposed and displayed on the picture of the virtual environment. As shown in FIG. 4, the wheel aiming control 40 includes a wheel region and a joystick button 42. As shown in FIG. 8, the foregoing step 704 includes step 704*a* to step 704*d* as follows:

Step 704*a*: Calculate, in response to the aiming instruction, an offset vector pointing from an activation point to an offset point.

A touch screen in the terminal is triggered by a drag operation to report a series of touch instructions to a central processing unit (CPU), which include, but are not limited to: a touch start instruction, at least one touch movement instruction, and a touch end instruction. Each touch instruction carries real-time touch coordinates of a finger of the user on the touch screen. The series of touch instructions triggered by the drag operation may all be considered as an aiming instruction. Alternatively, touch instructions triggered by the drag operation in a non-dead region may all be considered as an aiming instruction.

Figure 9:
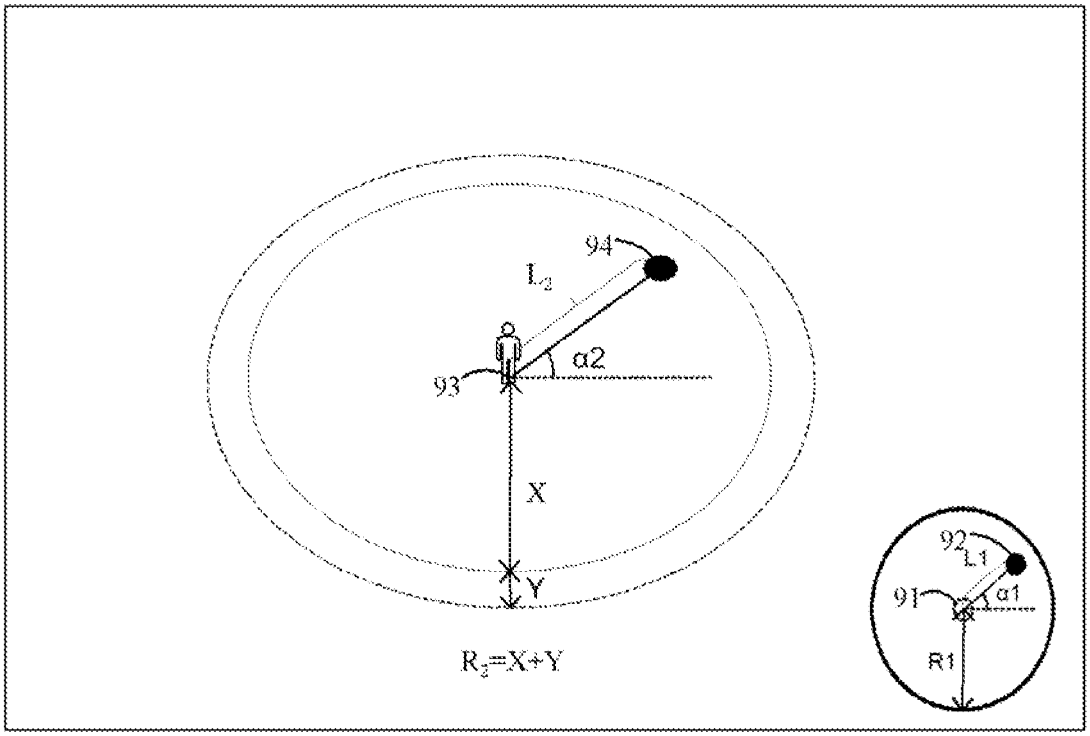
FIG. 9 is a schematic diagram of mapping of a method for aiming at a virtual object according to another exemplary embodiment of the disclosure.

With reference to FIG. 9, an activation point 91 refers to a center position of the wheel region. In some embodiments, the center position of the wheel region is fixed. In some other embodiments, the center position of the wheel region changes dynamically, when a right thumb of the user falls down, the touch screen detects that a position at which the finger falls down is set to the center position of the wheel region.

When the right thumb of the user drags the joystick button in the wheel region, a position of the joystick button may offset from the activation point 91 to an offset point 92. The client records first coordinates of the activation point, second coordinates of the offset point are read from the aiming instruction, and the offset vector is obtained through calculation according to the second coordinates and the first coordinates.

The offset vector is a vector pointing from the activation point 91 to the offset point 92, the first coordinates and the second coordinates are both coordinates of a plane on which the touch screen is located, and the offset vector is a vector located on the plane of the touch screen.

Step 704*b*: Calculate an aiming vector according to the offset vector.

The aiming vector is a vector pointing from a first map point 93 in which the first virtual object is located to an aiming point 94.

A ratio of a length L1 of the offset vector to a wheel radius R1 is equal to a ratio of a length L2 of the aiming vector to an aiming radius R2. The wheel radius R1 is a radius of the wheel region, and the aiming radius R2 is a maximum aiming distance of the first virtual object during active aiming In some embodiments, the aiming radius R2 is equal to a maximum shooting range distance x of a targeted ability (or targeted attack). In some other embodiments, the aiming radius R2 is equal to a sum of a maximum shooting range distance x of a targeted ability (or targeted attack) and a pre-aiming distance y. In this embodiment, the latter is used as an example, and even though the second virtual object is outside a maximum shooting range of a targeted ability, aiming and locking may be also performed in advance.

$\alpha 1$ is equal to an aiming angle $\alpha 2$. $\alpha 1$ is an offset angle of the offset vector relative to a horizontal direction, and $\alpha 2$ is an offset angle of the aiming vector relative to an x axis in the virtual environment.

The aiming vector is a vector in the virtual environment. When the virtual environment is a three-dimensional virtual environment, the aiming vector is a vector on a plane in the virtual environment.

Step 704*c*: Calculate the aiming point according to the aiming vector and a first map point in which the first virtual object is located.

The client adds the first map point to the aiming vector, to obtain the aiming point through calculation. The aiming point is a point located on a ground plane of the virtual environment.

Step 704*d*: Display the dot aiming indicator on the aiming point in the virtual environment.

Based on the above, according to the method provided in this embodiment, the aiming point 94 is obtained through accurate mapping according to the offset point 92, so that when the user uses the wheel aiming control, an operation similar to clicking of a mouse on a computer side is obtained, thereby improving the aiming accuracy during active aiming.

In an embodiment based on the embodiment of FIG. 7, the target selection range is a selection range determined by using the aiming point as a benchmark. The target selection range is located on the ground plane of the virtual environment, the target selection range uses a first map point in which the first virtual object is located as a rotation center, and a symmetry axis of the target selection range runs through the aiming point. The target selection range is an axially symmetrical pattern.

The target selection range may be at least one of a fan-shaped range, a semicircular range, and a circular range. Alternatively, the target selection range is a range obtained by mixing at least two geometric patterns, and the geometric patterns include: a square pattern, a diamond pattern, a triangular pattern, a circular pattern, and a fan-shaped pattern.

Figure 10:
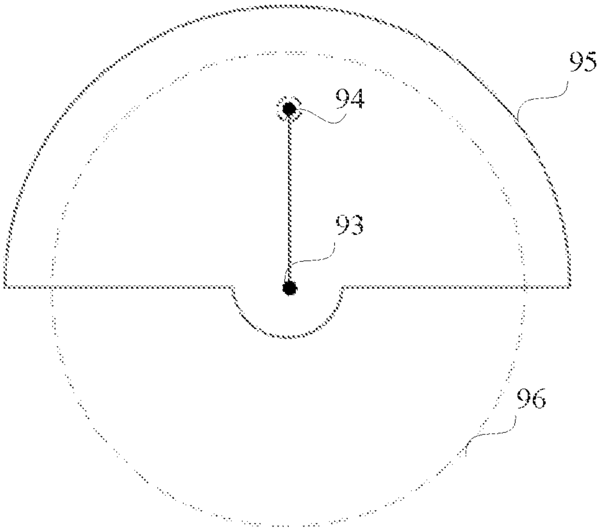
FIG. 10 is a schematic diagram of a range of a target selection range according to an exemplary embodiment of the disclosure.

In the example shown in FIG. 10, the target selection range 95 uses the first map point 93 in which the first virtual object is located as a rotation center, and a symmetry axis of the target selection range 95 runs through the aiming point 94. The target selection range 95 is a range after a circular pattern and a semicircular pattern are mixed.

Figure 11:
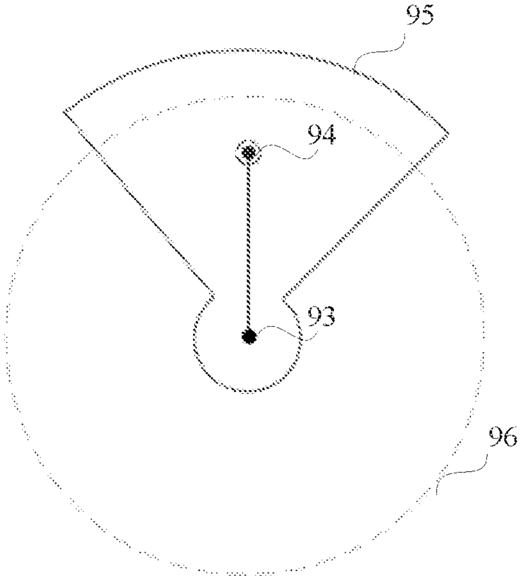
FIG. 11 is a schematic diagram of a range of a target selection range according to another exemplary embodiment of the disclosure.

In the example shown in FIG. 11, the target selection range 95 uses the first map point 93 in which the first virtual object is located as a rotation center, and a symmetry axis of the target selection range 95 runs through the aiming point 94. The target selection range 95 is a range after a circular pattern and a fan-shaped pattern are mixed.

For example, the first virtual object includes a maximum shooting range 96 when performing a targeted ability or a targeted attack, and the maximum shooting range 96 may be a circular range by using the first map point 93 in which the first virtual object is located as a center of a circle. The target selection range 95 includes a pre-aiming region located outside the maximum shooting range 96 and an aiming region located within the maximum shooting range 96.

Figure 12:
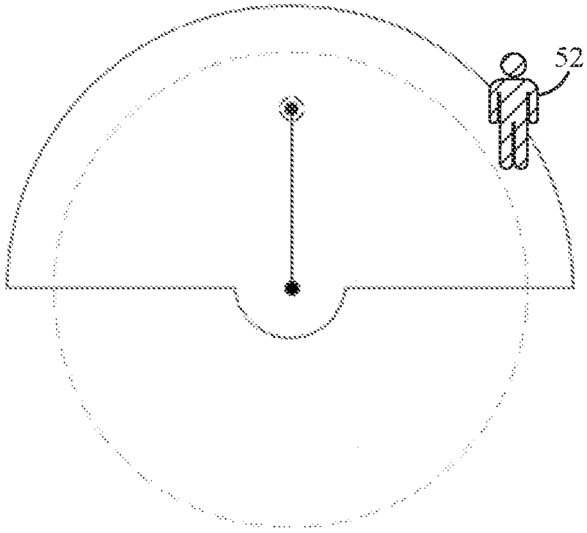
FIG. 12 is a schematic diagram of pre-aiming of a virtual object according to another exemplary embodiment of the disclosure.

As shown in FIG. 12, by using this design, the user may lock a target virtual object at a further distance in the pre-aiming region in advance.

Figure 13:
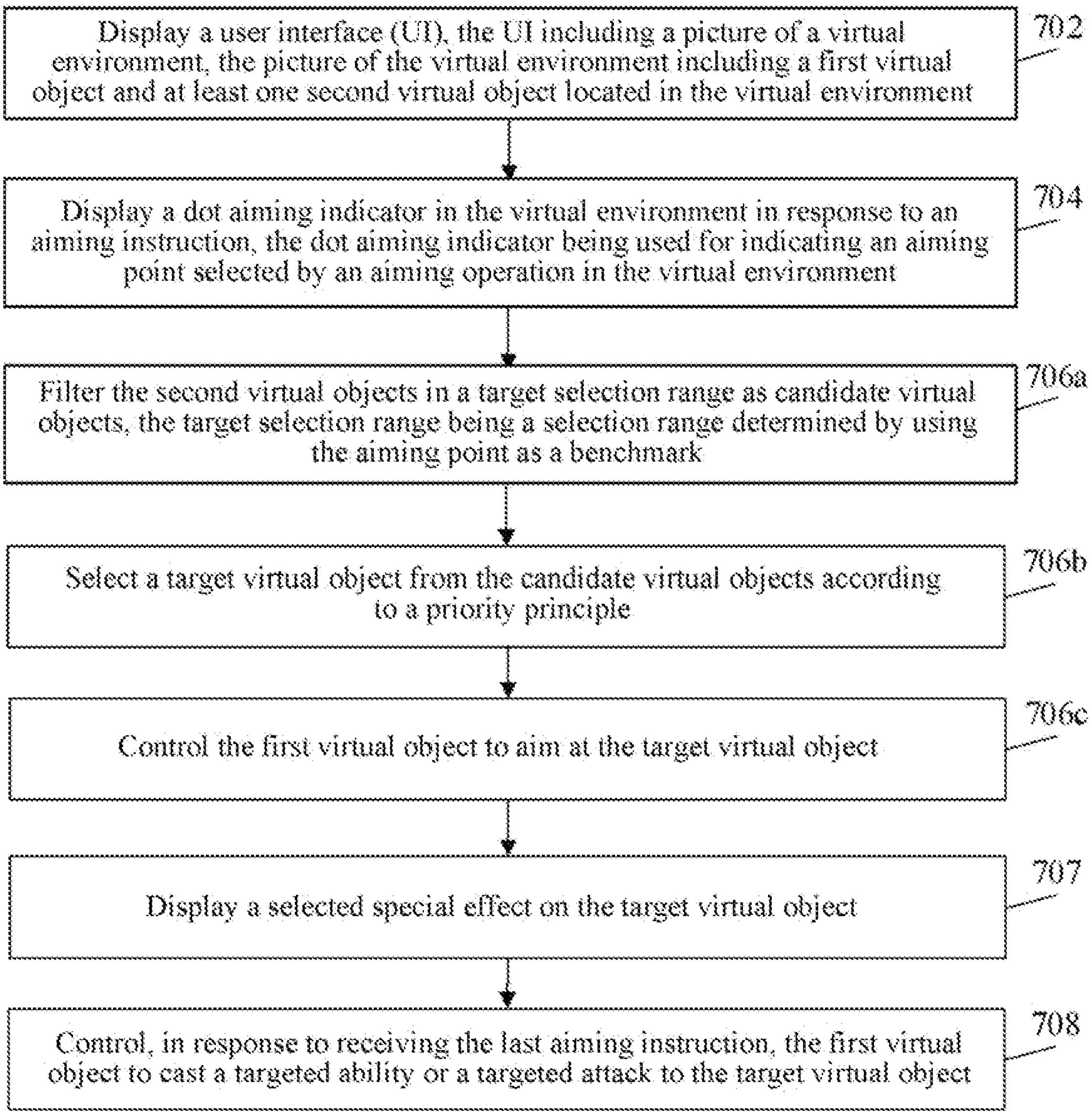
FIG. 13 is a flowchart of a method for aiming at a virtual object according to another exemplary embodiment of the disclosure.

In an embodiment based on the embodiment of FIG. 7, the aiming instruction is triggered by the wheel aiming control. The UI displayed by the client includes a wheel aiming control, and the wheel aiming control is superimposed and displayed on the picture of the virtual environment. As shown in FIG. 4, the wheel aiming control 40 includes a wheel region and a joystick button 42. As shown in FIG. 13, the foregoing step 706 includes step 706*a* to step 706*c* as follows:

Step 706*a*: Filter the second virtual objects in the target selection range as candidate virtual objects.

The client lists all second virtual objects within a range using the first map point 93 as a center of a circle and the aiming radius R2 as a radius as initial candidate virtual objects. The initial candidate virtual objects are then filtered by using a filter, second virtual objects located outside the target selection range are filtered out, and second virtual objects located within the target selection range are reserved and listed as candidate virtual objects.

The candidate virtual objects further need to meet valid conditions, and the valid conditions include, but are not limited to: the candidate virtual objects and the first virtual object do not belong to the same camp, the candidate virtual objects are not virtual objects of a specific type (for example, a building, a dragon or a baron, and a pink), and the candidate virtual objects are not virtual objects in a specific state (invisible or not selectable).

Step 706*b*: Select the target virtual object from the candidate virtual objects according to a priority principle.

The priority principle includes at least one of the following principles:

1. Distance Preferential Principle.

Figure 14:
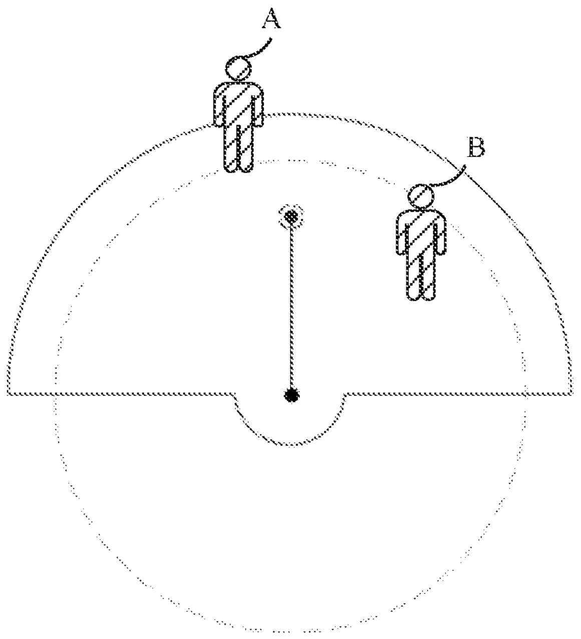
FIG. 14 is a schematic diagram of preferentially aiming according to a distance according to another exemplary embodiment of the disclosure.

A candidate virtual object that is closest to the aiming point is preferentially selected. As shown in FIG. 14, in the candidate virtual objects, a candidate virtual object A and a candidate virtual object B exist at the same time, a straight-line distance between the candidate virtual object A and the aiming point is a first distance, and a straight-line distance between the candidate virtual object B and the aiming point is a second distance. When the first distance is less than the second distance, the candidate virtual object A is preferentially selected as the target virtual object.

2. Health Bar Preferential Principle.

Figure 15:
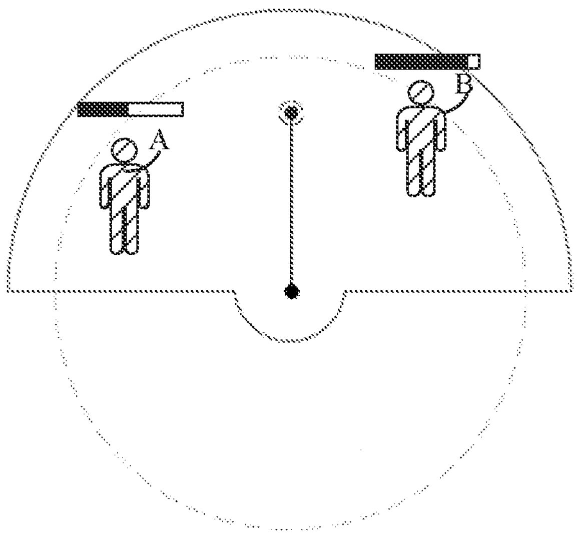
FIG. 15 is a schematic diagram of preferentially aiming according to a health bar according to another exemplary embodiment of the disclosure.

A candidate virtual object having a lowest health bar is preferentially selected. As shown in FIG. 15, in the candidate virtual objects, a candidate virtual object A and a candidate virtual object B exist at the same time, a health bar of the candidate virtual object A is 43%, a health bar of the candidate virtual object B is 80%, and the candidate virtual object A is preferentially selected as the target virtual object.

3. Health Point Absolute Value Preferential Principle.

A candidate virtual object having a smallest health point absolute value is preferentially selected. For example, in the candidate virtual objects, a candidate virtual object A and a candidate virtual object B exist at the same time, a health point of the candidate virtual object is 1200, a health point of the candidate virtual object B is 801, and the candidate virtual object B is preferentially selected as the target virtual object.

4. Type Priority Preferential Principle.

A candidate virtual object having a highest type priority is preferentially selected. For example, in the candidate virtual objects, a candidate virtual object A and a candidate virtual object B exist at the same time, a type of the candidate virtual object is hero, a type of the candidate virtual object is minion, a priority of the hero is greater than a priority of the minion, and the candidate virtual object A is preferentially selected as the target virtual object.

When the priority principle includes at least two different priority principles, a primary priority principle and a secondary priority principle may be set. After selection is completed by using the primary priority principle, if no selection result exists or more than one selection result exists, selection is performed by using the secondary priority principle. For example, selection is first performed according to the distance preferential principle, and when there are two candidate virtual objects whose distances to the aiming point are the same, selection is then performed according to the type priority preferential principle to obtain a final target virtual object.

When the priority principle includes at least two different priority principles, weight sum is performed on the different priority principles, to calculate a priority score of each candidate virtual object, and a candidate virtual object with a highest priority score is selected as the final target virtual object. For example, the priority score is calculated according to a type of a virtual object and a distance to the aiming point, and a hero around the aiming point may be preferentially selected relative to minions.

Step 706*c*: Control the first virtual object to aim at the target virtual object.

Step 707: Display a selected special effect on the target virtual object.

The selected special effect includes at least one of the following special effects: displaying a first selected identifier on a second map point in which the target virtual object is located, and displaying a second selected identifier above the target virtual object.

For example, the first selected identifier is a circular lighting special effect displayed under the feet of the target virtual object, the second selected identifier is a circular light pillar special effect displayed above the head of the target virtual object, and a specific form of the selected special effect is not limited in this embodiment.

For example, in response to that the second map point in which the target virtual object is located is in the pre-aiming region, the first selected special effect is displayed on the target virtual object; and in response to that the second map point in which the target virtual object is located is in the aiming region, the second selected special effect is displayed on the target virtual object, and the first selected special effect and the second selected special effect are different. For example, colors of the first selected special effect and the second selected special effect are different.

Step 708: Control, in response to receiving the last aiming instruction, the first virtual object to cast a targeted ability or a targeted attack to the target virtual object.

Based on the above, according to the method provided in this embodiment, an aimed target virtual object is selected from the at least one second virtual object in the target selection range according to a priority principle, so that an aimed target that the user intends to select may be accurately selected, thereby improving the operation fault tolerance of the user, and providing an automatic aiming solution having a certain intelligence degree.

According to the method provided in this embodiment, in response to that the second map point in which the target virtual object is located is in the aiming region, the second selected special effect is displayed on the target virtual object, so that the user may explicitly know that the target virtual object is in an aimed state or in a pre-aiming locked state, thereby improving the human-computer interaction efficiency, and enhancing an information amount displayed by a selected special effect.

Figure 16:
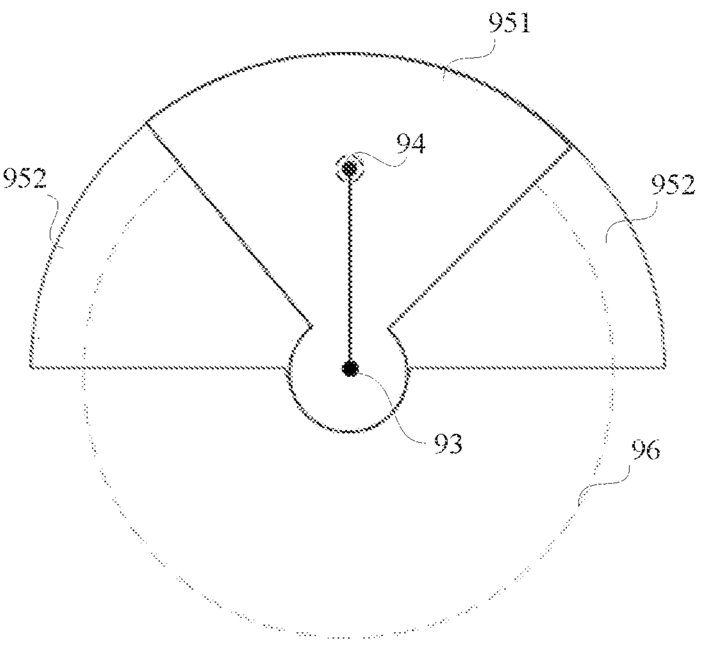
FIG. 16 is a schematic diagram of a range of a target selection range according to another exemplary embodiment of the disclosure.

In an embodiment based on the embodiment of FIG. 13, as shown in FIG. 16, the target selection range 95 includes a first selection range 951 (fan-shaped) and a second selection range 952 (semicircular). The first selection range 951 and the second selection range 952 are partially overlapped with each other, but a priority of the first selection range 951 is greater than a priority of the second selection range 952. In response to that second virtual objects exist in the first selection range 951, the second virtual objects in the first selection range 951 are preferentially set as candidate virtual objects; and in response to that no second virtual object exists in the first selection range 951, second virtual objects in the second selection range 952 are set as candidate virtual objects.

In a case that candidate virtual objects need to meet valid conditions, in response to that second virtual objects meeting the valid conditions exist in the first selection range 951, the second virtual objects meeting the valid conditions in the first selection range 951 are preferentially set as candidate virtual objects; and in response to that no second virtual object meeting the valid conditions exists in the first selection range 951, second virtual objects meeting the valid conditions in the second selection range 952 are set as candidate virtual objects.

In a design, the first selection range 951 corresponds to a first priority principle, and the second selection range 952 corresponds to a second priority principle. The first priority principle and the second priority principle are different, for example, the first priority principle is a health bar preferential principle, and the second priority principle is a distance preferential principle.

In response to that the candidate virtual objects fall within the first selection range 951, the target virtual object is selected from the candidate virtual objects according to the first priority principle; and in response to that the candidate virtual objects fall within the second selection range 952, the target virtual object is selected from the candidate virtual objects according to the second priority principle.

Figure 17:
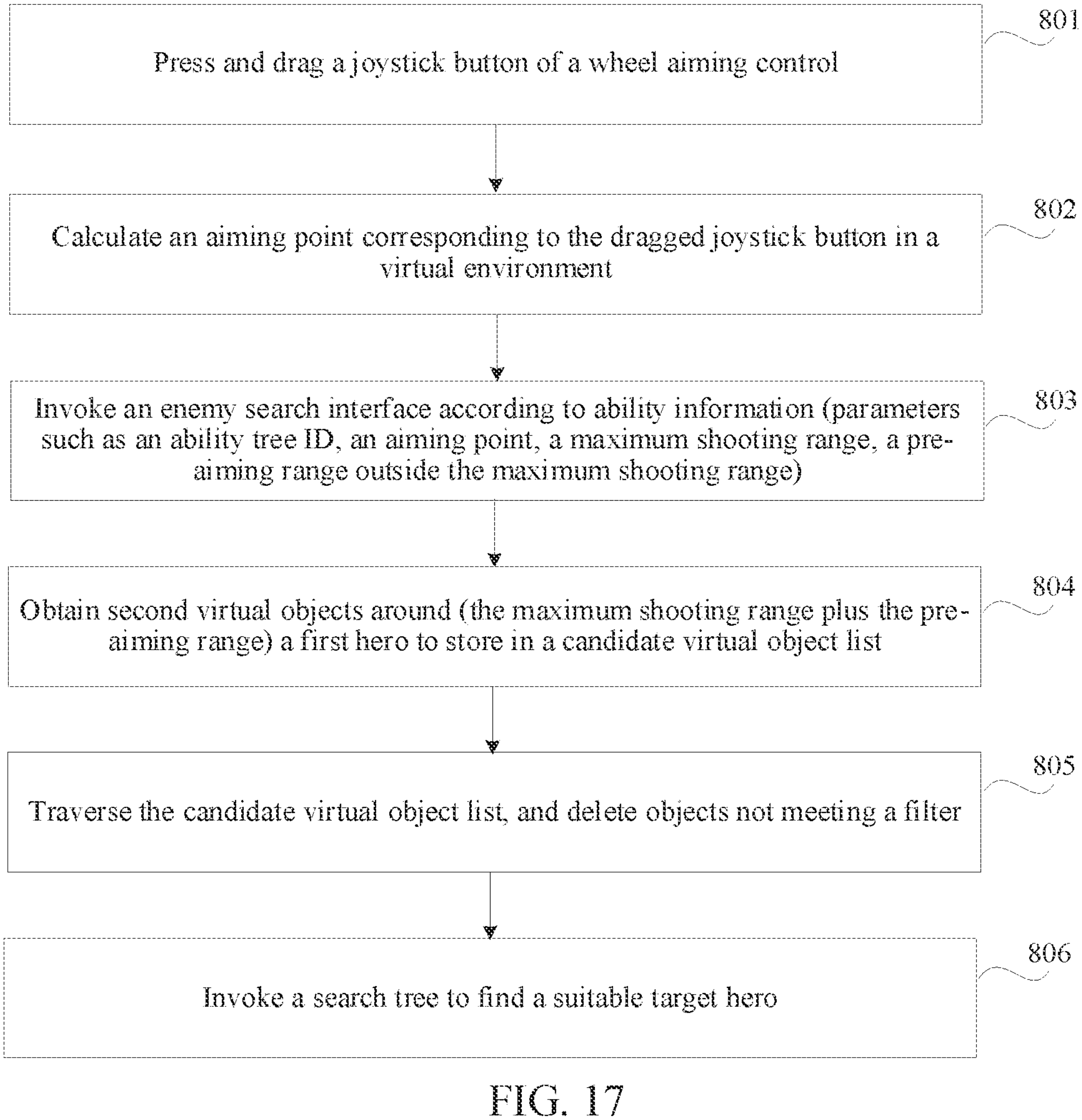
FIG. 17 is a flowchart of a method for aiming at a virtual object according to another exemplary embodiment of the disclosure.

An example in which the first virtual object casts a targeted ability to the target virtual object is used, as shown in FIG. 17, the method for aiming at a virtual object includes the following steps:

Step 801: Press and drag a joystick button of a wheel aiming control.

When the joystick button is pressed, the touch screen reports a touch start event to a CPU, and the client records first coordinates in the touch start event as an activation point DownPos.

When the joystick button is dragged, the touch screen reports touch movement events to the CPU according to sampling frequency, and the client records second coordinates in the closest touch movement event as an offset point DragPos.

Step 802: Calculate an aiming point FocusPoint corresponding to the dragged joystick button in a virtual environment.

It is set that a wheel radius (a maximum drag range) in the wheel aiming control is MaxDragRadius, a first map point in which a first hero controlled by the user in the virtual environment is HeroPos, and a maximum shooting range radius of the targeted ability is X, an offset position of the aiming point relative to the first map point is calculated by using the following ratio relationship:

$$|\text{DragPos}-\text{DownPos}|/\text{MaxDragRadius}=|\text{FocusPoint}-\text{HeroPos}|/X;$$

In addition, an orientation of the aiming point FocusPoint relative to the first map point HeroPos needs to be calculated. For example, a position of a screen center point (0, 0) is first mapped into a position ScreenCenter2SencePos in a three-dimensional virtual environment, the position ScreenCenter2SencePos is also an observation center of a camera model, and a reference point ScreenDrag2ScenePos is mapped by using a position obtained by adding the screen point (0, 0) to an offset vector (DragPos−DownPos). An orientation of the reference point ScreenDrag2ScenePos relative to a position of the observation center ScreenCenter2SencePos in the three-dimensional virtual environment is the orientation of the aiming point FocusPoint relative to the position of first map point HeroPos. Based on the above, the following formula is obtained:

$$\text{FocusPoint}=\text{HeroPos}+(|\text{DragPos}-\text{DownPos}|/\text{MaxDragRadius})*X*\text{Normalize}(\text{ScreenDrag2ScenePos}-\text{ScreenCenter2SencePos}).$$

Normalize represents normalization.

Step 803: Invoke an enemy search interface according to ability information (parameters such as an ability tree ID, an aiming point, a maximum shooting range, a pre-aiming range outside the maximum shooting range).

The ability tree ID refers to an identifier of the targeted ability. The maximum shooting range refers to a maximum shooting range of the targeted ability and is generally a circular range. The maximum shooting range is represented by using the foregoing maximum shooting range radius X. The pre-aiming range outside the maximum shooting range is represented by using Y. Y may be independently configured for each targeted ability by a planner.

Step 804: Obtain other virtual objects around (the maximum shooting range plus the pre-aiming range) a first hero to store in a candidate virtual object list.

The enemy search interface adds all other heroes in a circular range determined by using the first map point in which the first hero is located as a center and (X+Y) as a radius to a target list. X is a radius of the maximum shooting range of the targeted ability, Y is a difference between a radius of the pre-aiming range and the radius of the maximum shooting range, and as shown in FIG. 9, the pre-aiming range is a circle-shaped range sleeved outside the maximum shooting range.

Step 805: Traverse the candidate virtual object list, and delete objects not meeting a filter.

The planner may configure a filter ID for each targeted ability, and the filer ID is a valid condition that a case target of the targeted ability needs to meet. For example, the target is a virtual object belonging to different camps with the first hero, the target is not a virtual object of a specific type (for example, a building, a dragon or a baron, and a pink), and the target is not a virtual object in a specific state (hidden or not selectable).

The client traverses candidate virtual objects in the candidate virtual object list to check whether the filter rule is met, and deletes candidate virtual objects not meeting the filter from the candidate virtual object list.

Step 806: Invoke a search tree to find a suitable second hero.

Figure 18:
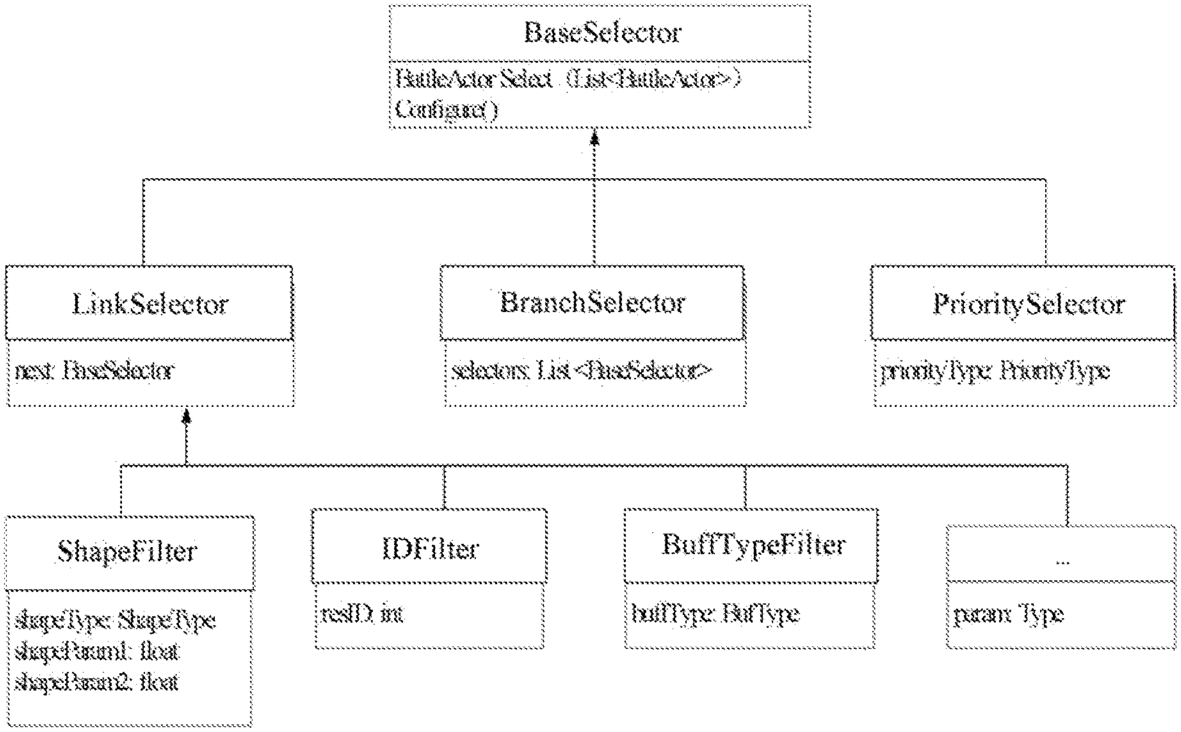
FIG. 18 is a schematic diagram of a program structure according to another exemplary embodiment of the disclosure.

FIG. 18 shows a structure of the search tree, first, all nodes in the search tree are inherited from a BaseSelector node, the BaseSelector node mainly has two function methods Configure and BattleActor Select, and the BattleActor refers to a candidate virtual object.

The Configure function is used for initialize data of a Selector subclass according to table data configured by the planner. For example, a BranchSelector node needs to be configured with a plurality of branches, and data configured by the Configure is Ids of the plurality of branch Selectors. In another example, a field in a shape of the target selection range such as a circle or a fan needs to be configured in a ShapeFilter node, and certainly, parameters such as a radius of the circle and an angle of the fan need to be further configured.

An input parameter of the BattleActor Select function is a candidate virtual object list List<BattleActor>, and a returned parameter is filtered candidate virtual objects BattleActor. However, actual content may have different actions according to different implementations of Selector subclasses.

The BaseSelector node includes three core derived subclasses: LinkSelector, BranchSelector, and PrioritySelector.

LinkSelector: a core has a next parameter, and is used for representing a next required filer, so as to form a chain-shaped structure. The subclass has a plurality of subclasses, and many subclasses are basically filters. Candidate virtual objects BattleActor not meeting a valid rule are mainly deleted in the Select function, and the List<BattleActor> from which the candidate virtual objects not meeting the valid rule are deleted is transmitted to a next Selector, and a filter is implemented in this way. For example, the ShapeSelector corresponding to the target selection range may configure required patterns and parameters in the Configure, the Select function may determine whether candidate virtual objects in the List<BattleActor> fall within the shape range corresponding to the target selection range one by one, and delete candidate virtual objects not in the target selection range from the List<BattleActor>. Other filters are similar, for example, BuffTypeFilter may delete candidate virtual objects having a type of addition buff effects, and IDSelector may delete candidate virtual objects including a buff ID to process that one ability cannot hit an enemy twice. In addition to the foregoing filters, a plurality of other specific filters may be further included, such as CanKillFilter for ensuring a kill when a current ability is cast, IDFilter used for screening one virtual object, the BuffTypeFilter used for screening virtual objects having a buff, and implementations of other Filters are not described herein again.

BranchSelector: a main function is to screen candidate virtual objects in a case of a plurality of selection ranges. For example, as shown in FIG. 16, when a fan-shaped region of the first selection range 951 needs to be determined first, and the second selection range 952 needs to be then determined, the BranchSelector is used. Some Selector IDs may be configured in a configuration table, a Selector ID initialization member variable selectors may be configured in the Configure function, a parameter List<BattleActor> actors required in the Select function may be temporarily stored, and BaseSelector in the selectors use the temporarily stored List<BattleActor> as a parameter one by one, to invoke the Select function to determine whether there is a returned candidate virtual object BattleActor. If there is a returned candidate virtual object BattleActor, it indicates that one candidate virtual object BattleActor has met the rule of the first selection range 951, and selectors of the second selection range 952 does not need to be traversed; and if there is no returned candidate virtual object, BaseSelector in the next selectors corresponding to the second selection range 952 is invoked.

PrioritySelector: the planner uses this Selector to sort filtered List<BattleActor>, to select a suitable target virtual object BattleActor. The planner needs to configure a priority principle in a table such as a health point preferential rule, a distance preferential rule, or a health bar preferential rule. The List<BattleActor> is sorted according to the configured priority principle in the Select function and a first result in the list is returned, and NULL is returned if the list is empty.

Figure 19:
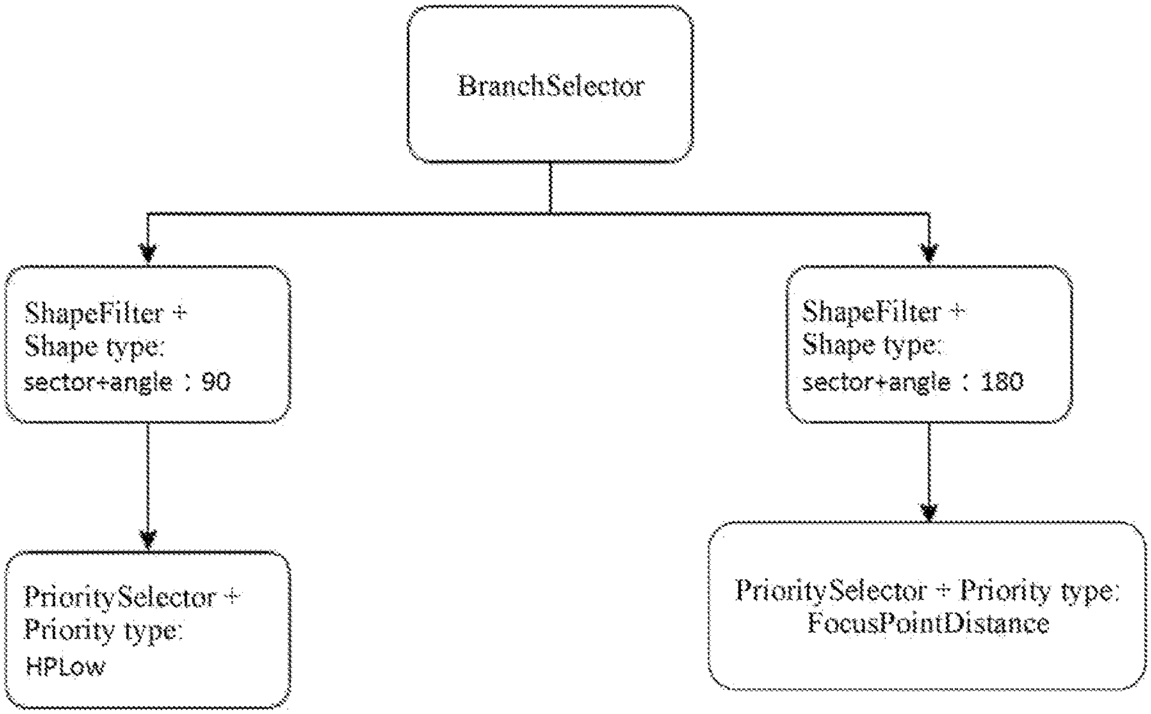
FIG. 19 is a schematic diagram of a program structure according to another exemplary embodiment of the disclosure.

According to usage of a combination of the foregoing selector, quite complex enemy search logic may be implemented. For example, as shown in FIG. 16, in a case that the first selection range 951 needs to be first determined, and the second selection range 952 needs to be then determined, it may be set that the priority principle in the first selection range 951 is a health point preferential rule, the priority principle in the second selection range 952 is a distance to the aiming point preferential rule, and a structure of the entire search tree is shown in FIG. 19.

Figure 20:
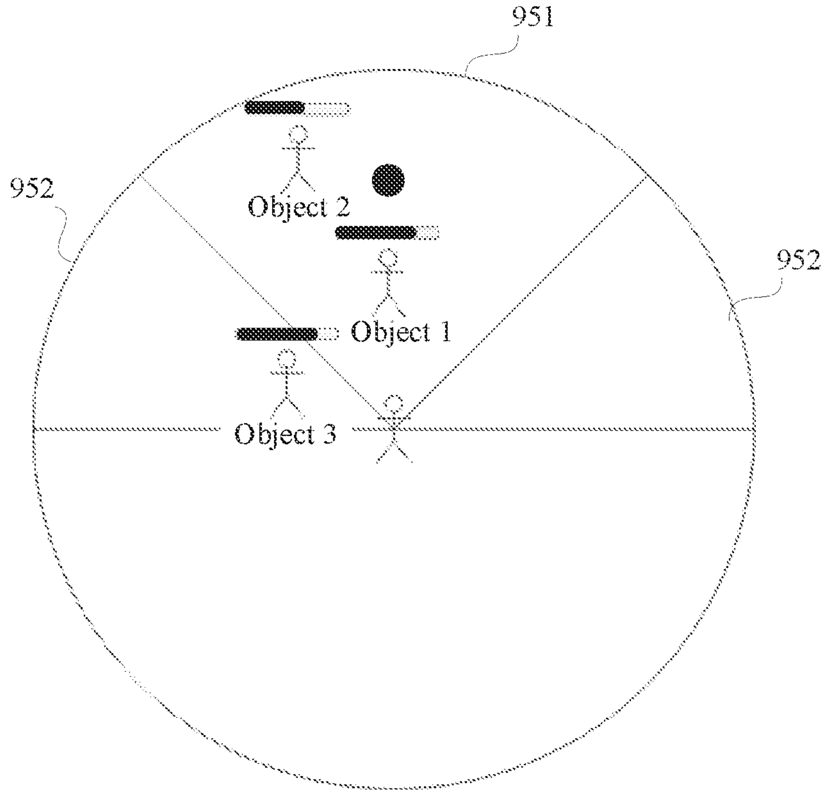
FIG. 20 is a schematic diagram of a scenario of aiming at a virtual object according to another exemplary embodiment of the disclosure.

With reference to the example shown in FIG. 20, the client may first obtain 3 candidate virtual objects, and the three candidate virtual objects are placed into a 90-degree fan-shaped filter corresponding to the first selection range 951. It is assumed that the object 3 is not within the first selection range 951, the object 3 may be deleted, and only the object 1 and the object 2 are left. The filter then sorts the object 1 and the object 2 according to a priority principle, since sorting in the first selection range 951 is preferentially performed according to a health point, the client may know that a health point of the object 2 is lower, so that the object 2 is returned as a final aimed target virtual object, and the object 2 is obtained through enemy searching.

Figure 21:
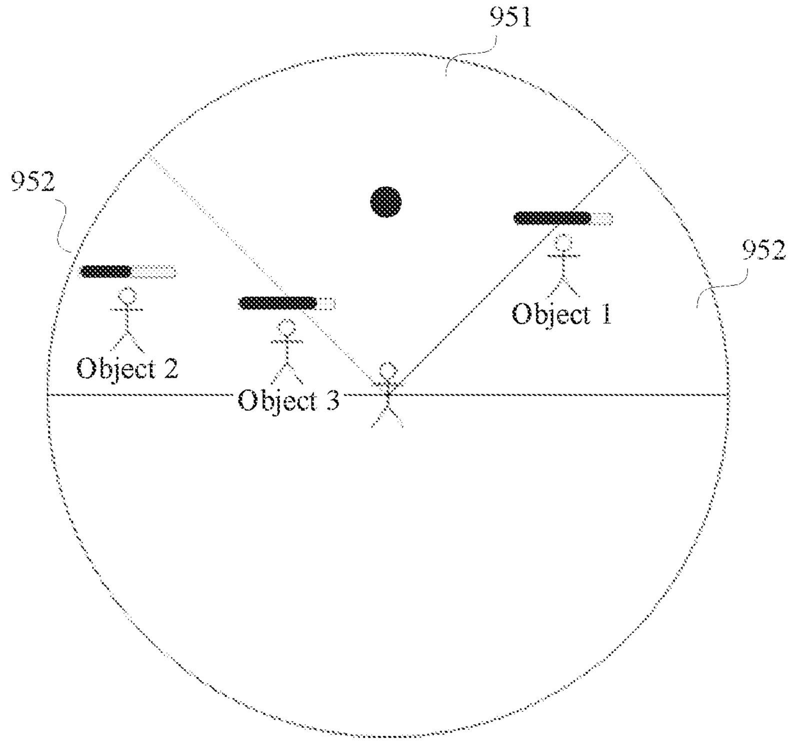
FIG. 21 is a schematic diagram of a scenario of aiming at a virtual object according to another exemplary embodiment of the disclosure.

With reference to the example shown in FIG. 21, the client may first obtain 3 candidate virtual objects, and the three candidate virtual objects are placed into a 90-degree fan-shaped filter corresponding to the first selection range 951. It is assumed that the object 1, the object 2, and the object 3 are not within the first selection range 951, the three candidate virtual objects may be deleted. The client then returns three candidate virtual objects belong to a second branch of BranchSelector corresponding to the second selection range 952, the client first places the three candidate virtual objects into a 180-degree semicircular filter corresponding to the second selection range 952, no candidate virtual object is deleted, and the object 1, the object 2, and the object 3 are then sorted according to distances to the aiming point. As can be known from the distances, the object 1 is closest to the aiming point, so that the object 1 is returned as a final aimed target virtual object.

The following describes apparatus embodiments of the disclosure. For details not described in detail in the apparatus embodiments, reference may be made to the foregoing method embodiments.

Figure 22:
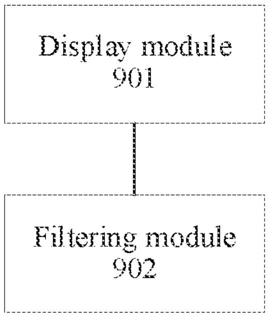
FIG. 22 is a block diagram of an apparatus for aiming at a virtual object according to another exemplary embodiment of the disclosure.

FIG. 22 is a block diagram of an apparatus for aiming at a virtual object according to an exemplary embodiment of the disclosure. The apparatus includes:

a display module 901, configured to display a user interface (UI), the UI including a picture of a virtual environment, the picture of the virtual environment being a picture obtained by observing the virtual environment by using a first virtual object as an observation center, the picture of the virtual environment including the first virtual object and at least one second virtual object located in the virtual environment;

the displaying module 901 being further configured to display a dot aiming indicator in the virtual environment in response to an aiming instruction, the dot aiming indicator being used for indicating an aiming point selected by an aiming operation on a ground plane of the virtual environment; and an aiming module 902, configured to control the first virtual object to aim at a target virtual object, the target virtual object being a virtual object selected from the at least one second virtual object in a target selection range, the target selection range being a selection range determined by using the aiming point as a benchmark.

In an example of this embodiment, the aiming module 902 is configured to filter the second virtual objects in the target selection range as candidate virtual objects; select the target virtual object from the candidate virtual objects according to a priority principle; and control the first virtual object to aim at the target virtual object.

In an example of this embodiment, the target selection range includes a first selection range and a second selection range, a priority of the first selection range is greater than that the second selection range; and the aiming module 902 is configured to preferentially filter, in response to that the second virtual objects exist in the first selection range, the second virtual objects in the first selection range as the candidate virtual objects; and filter, in response to that the second virtual objects do not exist in the first selection range, the second virtual objects in the second selection range as the candidate virtual objects.

In an example of this embodiment, the first selection range corresponds to a first priority principle, and the second selection range corresponds to a second priority principle; and the aiming module 902 is configured to select, in response to that the candidate virtual objects fall within the first selection range, the target virtual object from the candidate virtual objects according to the first priority principle; and select, in response to that the candidate virtual objects fall within the second selection range, the target virtual object from the candidate virtual objects according to the second priority principle.

In an example of this embodiment, the target selection range is located on the ground plane of the virtual environment, the target selection range uses a first map point in which the first virtual object is located as a rotation center, and a symmetry axis of the target selection range runs through the aiming point.

In an example of this embodiment, the first virtual object includes a maximum shooting range, and the target selection range includes a pre-aiming region located outside the maximum shooting range.

In an example of this embodiment, the priority principle includes at least one of the following principles:

preferentially selecting a candidate virtual object closest to the aiming point;

preferentially selecting a candidate virtual object having a lowest health bar;

preferentially selecting a candidate virtual object having a smallest health point absolute value; and preferentially selecting a candidate virtual object having a highest type priority.

In an example of this embodiment, the display module 901 is further configured to display a selected special effect on the target virtual object, the selected special effect including at least one of the following special effects: displaying a first selected identifier on a second map point in which the target virtual object is located, and displaying a second selected identifier above the target virtual object.

In an example of this embodiment, the first virtual object includes a maximum shooting range, and the target selection range includes a pre-aiming region located outside the maximum shooting range and an aiming region located within the maximum shooting range; and the display module 901 is further configured to display a first selected special effect on the target virtual object in response to that the second map point in which the target virtual object is located is located within the pre-aiming region; and display a second selected special effect on the target virtual object in response to that the second map point in which the target virtual object is located is located within the aiming region, the first selected special effect and the second selected special effect being different.

In an example of this embodiment, the UI includes a wheel aiming control, the wheel aiming control includes a wheel region and a joystick button; and the aiming instruction carries an offset point of the joystick button offsetting from an activation point in the wheel region, and the activation point is a center point of the wheel region; and the display module 901 is further configured to calculate, in response to the aiming instruction, an offset vector pointing from the activation point to the offset point; calculate an aiming vector according to the offset vector, the aiming vector being a vector pointing from a first map point in which the first virtual object is located to the aiming point, a ratio of the offset vector to a wheel radius being equal to a ratio of the aiming vector to an aiming radius, the wheel radius being a radius of the wheel region, and the aiming radius being a maximum aiming distance of the first virtual object during active aiming; calculate the aiming point according to the aiming vector and the first map point in which the first virtual object is located; and display the dot aiming indicator on the aiming point in the virtual environment.

The apparatus for aiming at a virtual object provided in the foregoing embodiments is illustrated with an example of division of the foregoing functional modules. During actual application, the functions may be allocated to and completed by different functional modules according to requirements, that is, the internal structure of the device is divided into different functional modules, to implement all or some of the functions described above. In addition, the apparatus for aiming at a virtual object provided in the foregoing embodiment belongs to the same concept as the method embodiment for aiming at a virtual object. For a specific implementation process of the apparatus, refer to the method embodiment. Details are not described herein again.

The disclosure further provides a terminal, the terminal includes a processor and a memory, the memory stores at least one instruction, and the at least one instruction is loaded and executed by the processor to implement the method for aiming at a virtual object provided in the foregoing method embodiments. The terminal may be a terminal provided in FIG. 23 below.

Figure 23:
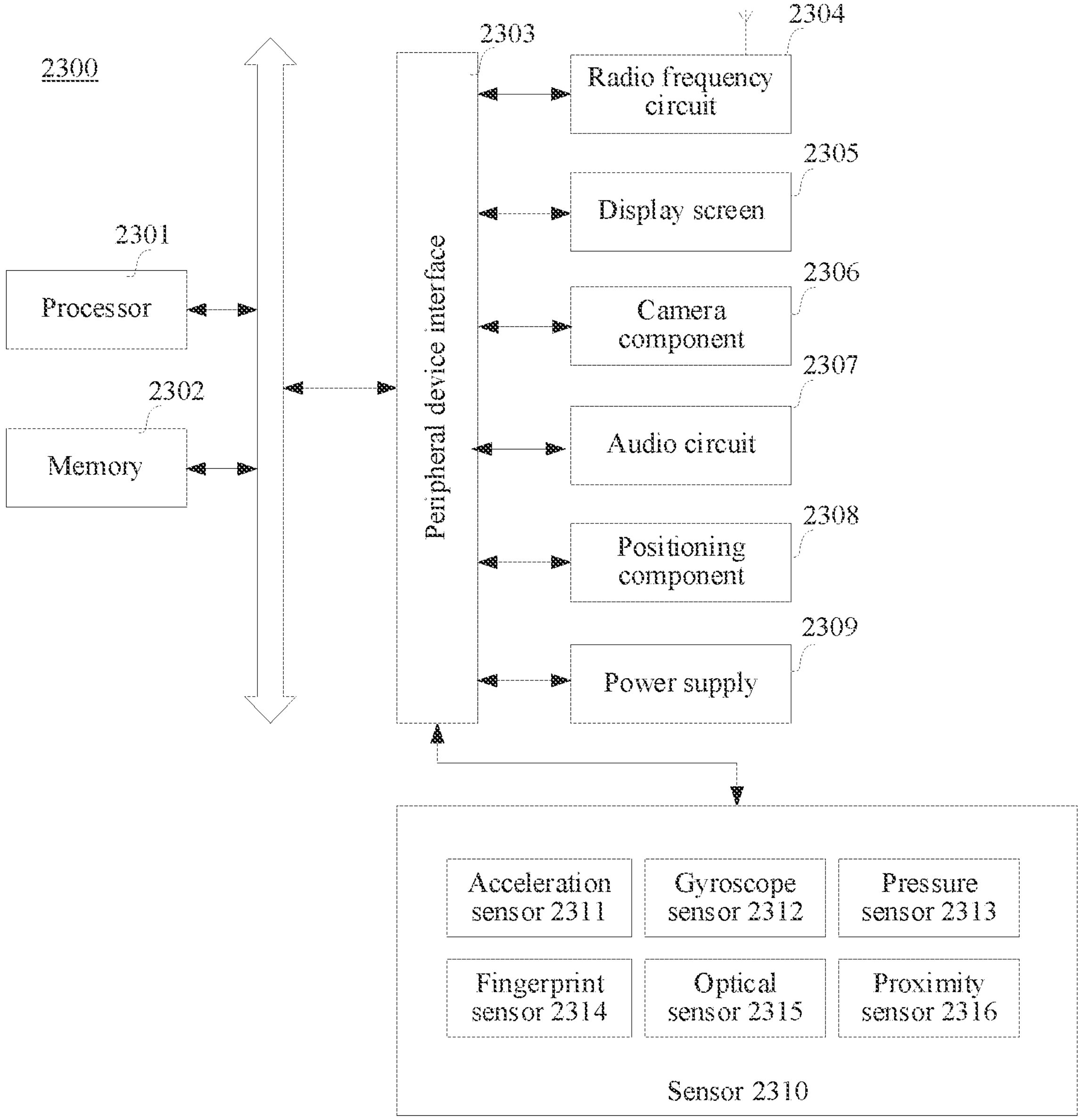
FIG. 23 is a block diagram of a terminal according to another exemplary embodiment of the disclosure.

FIG. 23 shows a structural block diagram of a terminal 2300 according to an exemplary embodiment of the disclosure. The terminal 2300 may be a smartphone, a tablet computer, a moving picture experts group audio layer III (MP3) player, a moving picture experts group audio layer IV (MP4) player, a notebook computer, or a desktop computer. The terminal 2300 may also be referred to as user equipment, a portable terminal, a laptop terminal, a desktop terminal, or the like.

Generally, the terminal 2300 includes a processor 2301 and a memory 2302.

The processor 2301 may include one or more processing cores, for example, a 4-core processor or an 8-core processor. The processor 2301 may be implemented by using at least one hardware form of a digital signal processor (DSP), a field-programmable gate array (FPGA), and a programmable logic array (PLA). The processor 2301 may alternatively include a main processor and a coprocessor. The main processor is a processor configured to process data in an active state, also referred to as a central processing unit (CPU). The coprocessor is a low-power processor configured to process data in a standby state. In some embodiments, the processor 2301 may be integrated with a graphics processing unit (GPU). The GPU is configured to render and draw content that needs to be displayed on a display screen. In some embodiments, the processor 2301 may further include an artificial intelligence (AI) processor. The AI processor is configured to process computing operations related to machine learning.

The memory 2302 may include one or more computer-readable storage media. The computer-readable storage medium may be non-transient. The memory 2302 may further include a high-speed random access memory and a non-volatile memory, for example, one or more disk storage devices or flash storage devices. In some embodiments, a non-transitory computer-readable storage medium in the memory 2302 is configured to store program code or at least one instruction, the code being configured to be executed by the processor 2301 to implement the method for aiming at a virtual object provided in the method embodiments of the disclosure.

In some embodiments, the terminal 2300 may optionally include a peripheral device interface 2303 and at least one peripheral device. The processor 2301, the memory 2302, and the peripheral device interface 2303 may be connected through a bus or a signal cable. Each peripheral device may be connected to the peripheral device interface 2303 through a bus, a signal line, or a circuit board. Specifically, the peripheral device includes: at least one of a radio frequency (RF) circuit 2304, a touch display screen 2305, a camera component 2306, an audio circuit 2307, a positioning component 2308, and a power supply 2309.

A person skilled in the art may understand that the structure shown in FIG. 23 does not constitute a limitation to the terminal 2300, and the terminal may include more components or fewer components than those shown in the figure, or some components may be combined, or a different component deployment may be used The memory further includes one or more programs. The one or more programs are stored in the memory and include code that can cause a processor to perform the operations or method for aiming at a virtual object provided in the embodiments of the disclosure.

The disclosure provides a computer-readable storage medium, storing at least one instruction, the at least one instruction being executed by a processor to implement the method for aiming at a virtual object provided in the foregoing method embodiments.

The disclosure further provides a computer program product, and the computer program product, when run on a computer, causes the computer to perform the method for aiming at a virtual object provided in the foregoing method embodiments.

The sequence numbers of the foregoing embodiments of the disclosure are merely for description purpose, and are not intended to indicate the preference among the embodiments.

A person of ordinary skill in the art may understand that all or some of the steps of the foregoing embodiments may be implemented by hardware, or may be implemented a program instructing related hardware. The program may be stored in a computer-readable storage medium. The storage medium may be: a read-only memory (ROM), a magnetic disk, or an optical disc.

The foregoing descriptions are merely preferred embodiments of the disclosure, and are not intended to limit the disclosure. Any modification, equivalent replacement, improvement and the like made within the spirit and principle of the disclosure shall fall within the protection scope of the disclosure.

What is claimed is:

1. A method, performed by a terminal, the method comprising:

displaying a virtual environment on a user interface (UI), the virtual environment comprising a first virtual object and a plurality of second virtual objects;

in response to receiving an aiming instruction on a control that is displayed in the virtual environment, displaying a region associated with a target skill, the region surrounding the first virtual object, the target skill being a skill that can be cast on a virtual object at a time;

determining a target selection range around a target point corresponding to the aiming instruction based on a casting range of the target skill, wherein the target selection range comprises a sub-set of the plurality of second virtual objects, and wherein a position of the target point in the virtual environment does not overlap with any of the sub-set of the plurality of second virtual objects;

automatically selecting a target virtual object from the sub-set of the plurality of second virtual objects based on the target selection range, the target point, and a position of the sub-set of the plurality of second virtual objects with respect to the target point and the target selection range, wherein the automatic selection is performed without a user input for selecting the target virtual object, wherein once the target virtual object is automatically selected, a visual indication of the selection of the target virtual object is displayed on the UI prior to a casting of the target skill, and controlling the first virtual object to cast the target skill at the target virtual object, wherein the target virtual object is a second virtual object among the sub-set of the plurality of second virtual objects within the target selection range, and wherein the target skill is cast at the target virtual object without positioning the target point over the target virtual object, wherein the automatic selection comprises determining whether the sub-set of the plurality of second virtual objects is located in a first selection range of the target selection range or a second selection range of the target selection range, to apply a corresponding priority principle for selecting the target virtual object, the corresponding priority principle being different based on which selection range the sub-set of the plurality of second virtual objects is located in, wherein when two or more second virtual objects of the sub-set of the plurality of second virtual objects are positioned in the first selection range, a first priority principle is applied to select the target virtual object from the two or more second virtual objects in the first selection range based on a comparison of health values of the two or more second virtual objects in the first selection range, and wherein when the two or more second virtual objects of the sub-set of the plurality of second virtual objects are positioned in the second selection range, a second priority principle is applied to select the target virtual object from the two or more second virtual objects in the second selection range based on a comparison of distances between each of the two or more second virtual objects in the second selection range and the target point.

2. The method according to claim 1, wherein a priority of the first selection range is greater than a priority of the second selection range.

3. The method according to claim 1, wherein the target selection range is located on a ground plane of the virtual environment.

4. The method according to claim 1, wherein the first virtual object comprises a maximum shooting range, and the target selection range comprises a pre-aiming region located outside the maximum shooting range.

5. The method according to claim 1, wherein the corresponding priority principle comprises at least one of:

preferentially selecting a candidate virtual object closest to an aiming point;

preferentially selecting a candidate virtual object having a lowest health bar;

preferentially selecting a candidate virtual object having a smallest health point absolute value; and preferentially selecting a candidate virtual object having a highest type priority.

6. The method according to claim 1, wherein the first virtual object comprises a maximum shooting range, and the target selection range comprises a pre-aiming region located outside the maximum shooting range and an aiming region located within the maximum shooting range; and the displaying the visual indication comprises:

displaying a first selected special effect based on determining that the target virtual object is located within the pre-aiming region; and displaying a second selected special effect on the target virtual object based on determining that the target virtual object is located within the aiming region, the first selected special effect and the second selected special effect being different.

7. The method according to claim 1, wherein the UI comprises an aiming control and the aiming control comprises a central region and a surrounding region that surrounds the central region, wherein the aiming instruction is received on the surrounding region of the aiming control, and wherein the aiming instruction comprises an offset point in the surrounding region that is offset from an activation point at a center point of the central region; and the method further comprises:

displaying the region around the target point in the virtual environment.

8. An apparatus for aiming at a virtual object, comprising:

at least one memory configured to store program code;

at least one processor configured to access the program code and operate as instructed by the program code, the program code including:

display code configured to cause the at least one processor to display a virtual environment on a user interface (UI), the virtual environment comprising a first virtual object and a plurality of second virtual objects;

the display code being further configured to cause the at least one processor to, in response to receiving an aiming instruction on a control that is displayed in the virtual environment display a region associated with a target skill, the region surrounding the first virtual object, the target skill being a skill that can be cast on a virtual object at a time;

determining code configured to cause the at least one processor to determine a target selection range around a target point corresponding to the aiming instruction based on a casting range of the target skill, wherein the target selection range comprises a sub-set of the plurality of second virtual objects, and wherein a position of the target point in the virtual environment does not overlap with any of the sub-set of the plurality of second virtual objects;

automatically selecting code configured to cause the at least one processor to automatically select a target virtual object from the sub-set of the plurality of second virtual objects based on the target selection range, the target point, and a position of the sub-set of the plurality of second virtual objects with respect to the target point and the target selection range, wherein the automatic selection is performed without a user input for selecting the target virtual object, wherein once the target virtual object is automatically selected, a visual indication of the selection of the target virtual object is displayed on the UI prior to a casting of the target skill, and first controlling code configured to cause the at least one processor to control the first virtual object to cast the target skill at the target virtual object, wherein the target virtual object is a second virtual object among the sub-set of the plurality of second virtual objects within the target selection range, and wherein the target skill is cast at the target virtual object without positioning the target point over the target virtual object, wherein the automatically selecting code is further configured to cause the at least one processor to determine whether the sub-set of the plurality of second virtual objects is located in a first selection range of the target selection range or a second selection range of the target selection range, to apply a corresponding priority principle for selecting the target virtual object, the corresponding priority principle being different based on which selection range the sub-set of the plurality of second virtual objects is located in, wherein when two or more second virtual objects of the sub-set of the plurality of second virtual objects are positioned in the first selection range, a first priority principle is applied to select the target virtual object from the two or more second virtual objects in the first selection range based on a comparison of health values of the two or more second virtual objects in the first selection range, and wherein when the two or more second virtual objects of the sub-set of the plurality of second virtual objects are positioned in the second selection range, a second priority principle is applied to select the target virtual object from the two or more second virtual objects in the second selection range based on a comparison of distances between each of the two or more second virtual objects in the second selection range and the target point.

9. The apparatus according to claim 8, wherein the target selection range is located on a ground plane of the virtual environment.

10. The apparatus according to claim 8, wherein the first virtual object comprises a maximum shooting range, and the target selection range comprises a pre-aiming region located outside the maximum shooting range.

11. The apparatus according to claim 8, wherein the corresponding priority principle comprises at least one of:

preferentially selecting a candidate virtual object closest to an aiming point;

preferentially selecting a candidate virtual object having a lowest health bar;

preferentially selecting a candidate virtual object having a smallest health point absolute value; and preferentially selecting a candidate virtual object having a highest type priority.

12. The apparatus according to claim 8, wherein the first virtual object comprises a maximum shooting range, and the target selection range comprises a pre-aiming region located outside the maximum shooting range and an aiming region located within the maximum shooting range; and the automatically selecting comprises:

displaying a first selected special effect based on determining that the target virtual object is located within the pre-aiming region; and displaying a second selected special effect on the target virtual object based on determining that the target virtual object is located within the aiming region, the first selected special effect and the second selected special effect being different.

13. A non-transitory computer readable storage medium storing computer program code that, when executed by at least one processor, causes the at least one processor to:

display a virtual environment on a user interface (UI), the virtual environment comprising a first virtual object and a plurality of second virtual objects;

in response to receiving an aiming instruction on a control that is displayed in the virtual environment, displaying a region associated with a target skill, the region surrounding the first virtual object, the target skill being a skill that can be cast on a virtual object at a time;

determine a target selection range around a target point corresponding to the aiming instruction based on a casting range of the target skill, wherein the target selection range comprises a sub-set of the plurality of second virtual objects, and wherein a position of the target point in the virtual environment does not overlap with any of the sub-set of the plurality of second virtual objects;

automatically select a target virtual object from the sub-set of the plurality of second virtual objects based on the target selection range, the target point, and a position of the sub-set of the plurality of second virtual objects with respect to the target point and the target selection range, wherein the automatic selection is performed without a user input for selecting the target virtual object, wherein once the target virtual object is automatically selected, a visual indication of the selection of the target virtual object is displayed on the UI prior to a casting of the target skill, and control the first virtual object to cast the target skill at the target virtual object, wherein the target virtual object is a second virtual object among the sub-set of the plurality of second virtual objects within the target selection range, and wherein the target skill is cast at the target virtual object without positioning the target point over the target virtual object, wherein the automatic selection comprises determining whether the sub-set of the plurality of second virtual objects is located in a first selection range of the target selection range or a second selection range of the target selection range, to apply a corresponding priority principle for selecting the target virtual object, the corresponding priority principle being different based on which selection range the sub-set of the plurality of second virtual objects is located in, wherein when two or more second virtual objects of the sub-set of the plurality of second virtual objects are positioned in the first selection range, a first priority principle is applied to select the target virtual object from the two or more second virtual objects in the first selection range based on a comparison of health values of the two or more second virtual objects in the first selection range, and wherein when the two or more second virtual objects of the sub-set of the plurality of second virtual objects are positioned in the second selection range, a second priority principle is applied to select the target virtual object from the two or more second virtual objects in the second selection range based on a comparison of distances between each of the two or more second virtual objects in the second selection range and the target point.

* * * * *